(12) United States Patent
Zavadsky et al.

(10) Patent No.: US 12,011,963 B2
(45) Date of Patent: Jun. 18, 2024

(54) ROBOTIC VEHICLE AND A SUPPORT ASSEMBLY FOR A WHEEL THEREOF

(71) Applicant: YANDEX SELF DRIVING GROUP LLC, Moscow (RU)

(72) Inventors: Viktor Zavadsky, Moscow (RU); Ilya Gerasimov, Moscow (RU); Sergey Badanov, Moscow (RU)

(73) Assignee: Direct Cursus Technology L.L.C, Dubai (AE)

( * ) Notice: Subject to any disclaimer, the term of this patent is extended or adjusted under 35 U.S.C. 154(b) by 0 days.

(21) Appl. No.: 18/133,957

(22) Filed: Apr. 12, 2023

(65) Prior Publication Data

US 2023/0322038 A1      Oct. 12, 2023

(30) Foreign Application Priority Data

Apr. 12, 2022   (RU) ............................ RU2022109771

(51) Int. Cl.
     *B60G 17/016*    (2006.01)
(52) U.S. Cl.
     CPC .... *B60G 17/016* (2013.01); *B60G 2206/7101* (2013.01); *B60G 2500/30* (2013.01)
(58) Field of Classification Search
     CPC .............. B60G 17/016; B60G 2500/30; B60G 2200/132; B60G 3/14; B60G 2202/112; B60G 2204/143; B60G 7/001; B60G 7/008; B60G 7/02; B60G 11/04; B60G 17/0165
     See application file for complete search history.

(56) References Cited

U.S. PATENT DOCUMENTS

| 3,254,899 A | 6/1966 | Carl |
| 4,056,158 A | 11/1977 | Ross |
| 4,840,394 A * | 6/1989 | Bickler .................... B60G 5/01 280/682 |
| 8,695,737 B2 | 4/2014 | Ohruh |

(Continued)

FOREIGN PATENT DOCUMENTS

| CN | 107662666 A | 2/2018 |
| WO | 0228671 A1 | 4/2002 |

(Continued)

OTHER PUBLICATIONS

European Search Report dated Sep. 1, 2023 issued in respect of the European Patent Application No. 23167498.7.

*Primary Examiner* — Karen Beck
(74) *Attorney, Agent, or Firm* — BCF LLP

(57) ABSTRACT

An assembly for a wheel of a robotic vehicle and a method for overcoming an obstacle for said robotic vehicle. The assembly comprises a first arm portion and a second arm portion, the first arm portion being attachable to a chassis of the robotic vehicle at an attachment point and extending forwardly and downwardly relative to the attachment point in a direction of a movement of the robotic vehicle. The second arm portion is pivotably connected with the first arm portion at an arm pivot point and extends forwardly relative to the arm pivot point in the direction of the movement. The wheel is rotatably mounted on one end of the second arm portion opposed to the arm pivot point. A wheel rotation axis being positioned at least as high as the arm pivot point relative to a surface on which the robotic vehicle is positioned.

20 Claims, 13 Drawing Sheets

(56) References Cited

U.S. PATENT DOCUMENTS

| | | | |
|---|---|---|---|
| 10,239,378 B2 * | 3/2019 | Liivik | G05D 1/0238 |
| 10,967,926 B2 | 4/2021 | Liivik et al. | |
| 11,124,233 B1 | 9/2021 | Kurczewski et al. | |
| 2004/0163869 A1 | 8/2004 | Chun et al. | |
| 2005/0023052 A1 | 2/2005 | Beck et al. | |
| 2009/0172915 A1 | 7/2009 | Hunziker | |
| 2011/0083913 A1 | 4/2011 | Cuson et al. | |
| 2012/0217714 A1 * | 8/2012 | Kiselis | B60G 9/003 |
| | | | 280/124.116 |
| 2021/0284260 A1 | 9/2021 | Isono | |
| 2021/0309060 A1 | 10/2021 | Stelman et al. | |
| 2022/0176544 A1 * | 6/2022 | Chandler | B25J 5/007 |
| 2023/0060738 A1 * | 3/2023 | Zawacki | B60G 15/06 |

FOREIGN PATENT DOCUMENTS

| | | |
|---|---|---|
| WO | 2005039956 A2 | 5/2005 |
| WO | 2021076519 A1 | 4/2021 |

* cited by examiner

ROBOTIC VEHICLE AND A SUPPORT ASSEMBLY FOR A WHEEL THEREOF

CROSS-REFERENCE

The present application claims priority to Russian Patent Application No. 2022109771, entitled "Robotic Vehicle and a Support Assembly for a Wheel Thereof", filed Apr. 12, 2022, the entirety of which is incorporated herein by reference.

FIELD OF TECHNOLOGY

The present technology relates to a robotic vehicle, and more specifically, to a support assembly for a wheel thereof.

BACKGROUND

Autonomous robotic vehicles are vehicles that are able to autonomously navigate through private and/or public spaces. Using a system of sensors that detects the location and/or surroundings of the robotic vehicle, logic within or associated with the robotic vehicle controls the velocity and direction of the robotic vehicle based on the sensor-detected location and surroundings of the robotic vehicle.

A variety of sensor systems may be used by the robotic vehicle, such as but not limited to camera systems, radar systems, and LIDAR systems. Different sensor systems may be employed for capturing different information, and/or in different format, about the location and the surroundings of the robotic vehicle. For example, LIDAR systems may be used to capture point cloud data for building 3D map representations of the surroundings and other potential objects located in proximity to the robotic vehicle.

Such autonomous robotic vehicles are being used for a wide variety of applications, including delivering packages and other items. These applications may require the robotic vehicle to navigate through dynamic environments, such as on crowded sidewalks, through crosswalks where there may be human and vehicular traffic, and so on. In performing this navigation task, an autonomous robotic vehicle needs to avoid collisions with dynamic objects, such as people and moving vehicles, and with static objects, such as parked vehicles, buildings, lamp posts, and other common non-moving objects that may be found within the urban and suburban environments in which the robotic vehicle is expected to operate.

US Patent application no. 2005/023052 discloses a vehicle having a chassis and means for rolling the chassis along a path.

SUMMARY

The developers of the present technology have developed a device for a robotic vehicle for overcoming obstacles in urban environments. For example, such device may facilitate the robotic vehicle to climb a curb.

The developers have devised a wheel system with a support assembly for a wheel which facilitates overcoming obstacles. The support assembly, also referred herein as an "arm assembly", comprises a first arm portion and a second arm portion that are pivotably connected to each other and cooperate for facilitating climbing of an obstacle by the corresponding wheel of the robotic vehicle.

The first arm portion, also herein referred to as a "shoulder element", is attachable to a frame or a chassis of the robotic vehicle. The second arm portion, also herein referred to as a "forearm element", is pivotably connected to the shoulder element and has the corresponding wheel mounted thereto at a wheel rotation axis. When the arm assembly is attached to the frame of the robotic vehicle, a pivot point between the forearm element and the shoulder element, also herein referred to as an "elbow point", is positioned in a specific manner relative to the wheel rotation axis of the corresponding wheel. In some embodiments, the elbow point may be positioned at a level of the wheel rotation axis relative to a surface on which the robotic vehicle is positioned.

The shoulder element may be fixedly attached to the frame (or a chassis) of the robotic vehicle (and/or a suspension system of the robotic vehicle). In contrast, the forearm element may move relative to the shoulder element. The elbow point provides an angular range of movement of the forearm element relative to the shoulder element. In some embodiments, the arm assembly may further comprise a biasing element for limiting and/or dampening the angular range of movement of the forearm element relative to the shoulder element. In other words, the rotation of the forearm element may be limited and/or damped by a composite spring, for example, when the robotic vehicle is climbing an obstacle.

In some embodiments, one or more front wheels may be mounted onto corresponding arm assemblies for facilitating climbing of obstacles. It is also contemplated that wheels other than the front wheels may be mounted on corresponding arm assemblies, without departing from the scope of the present technology. It should be noted that the arm assembly can project forwardly, in a direction of travel, relative to the vertical plane passing through a point of attachment of the arm assembly to the robotic vehicle. In some embodiments, it is contemplated that the arm assembly may have a curved shape. In some embodiments, it is contemplated that the elbow point defines an obtuse angle between the shoulder element and the forearm element.

When the robotic vehicle is static, the shoulder element and the forearm element may form a reference angle at the elbow element. The reference angle may change during the movement of the robotic vehicle, especially when climbing an obstacle. During movement, the forearm element may be rotated about the elbow point such that a current angle formed by the shoulder element and the forearm element is larger, or smaller, than the reference angle. In other words, it can be said that the angular range of movement of the forearm element may include a first sub-range that is above the reference angle and a second sub-range that is below the reference angle. For example, the first sub-range and the second sub-range may be about 20 degrees.

Developers of the present technology have realized that positioning the elbow point of the arm assembly forwardly from the attachment point of the shoulder element to the robotic vehicle and at a same level than the wheel rotation axis of the corresponding wheel may facilitate the climbing of the robotic vehicle. It should be noted that the elbow point may not always be level with the wheel rotation axis during movement, such as when climbing, for example.

In other embodiments, it should be noted that the elbow point may not be level with the wheel rotation axis relative to a surface on which the robotic vehicle is positioned when the robotic vehicle is not climbing an obstacle. As an example, when the robotic vehicle moves on a substantially flat surface, an orthogonal distance between said surface and the elbow point may be shorter or longer than an orthogonal distance between said surface and the wheel rotation axis.

In a first broad aspect of the present technology, there is provided a support assembly for a wheel of a robotic vehicle, the robotic vehicle comprising a chassis, a body connected to the chassis, the wheel being connected to the chassis by the support assembly. The support assembly comprises a first arm portion and a second arm portion, the first arm portion being attachable to the chassis at an attachment point and projecting forwardly relative to the attachment point in a current direction of travel of the robotic vehicle and downwardly toward a ground surface on which the robotic vehicle navigates, the second arm portion being pivotably connected with the first arm portion at an arm pivot point, the second arm portion extending forwardly relative to the arm pivot point in the current direction of travel of the robotic vehicle, the wheel being rotatably mounted on one end of the second arm portion opposed to the arm pivot point, the wheel being rotatable around a wheel rotation axis, the wheel rotation axis being positioned at least as high as the arm pivot point relative to a surface on which the robotic vehicle is positioned.

In some embodiments, the wheel rotation axis is positioned at least as high as the arm pivot point relative to a surface includes the wheel rotation axis being positioned at a same level with the arm pivot point relative to a substantially flat surface on which the robotic vehicle.

In some embodiments, the support assembly further comprises a biasing element configured for limiting an angular range of movement of the second arm portion relative to the first arm portion.

In some embodiments, the support assembly further comprises a biasing element configured for dampening an angular range of movement of the second arm portion relative to the first arm portion.

In some embodiments, the biasing element comprises at least two resisting members, the at least two resisting members cooperating to dampen a rotation of the second arm portion around the arm pivot point.

In some embodiments, the biasing element is a composite spring element.

In some embodiments, the composite spring element is made from a fiberglass material.

In some embodiments, the second arm portion pivots upwardly at the arm pivot point during climbing of an obstacle.

In some embodiments, the second arm portion pivots downwardly at the arm pivot point during the climbing of the obstacle.

In another broad aspect of the present technology, there is provided a robotic vehicle comprising a computer system, a plurality of sensors communicably connected the computer system, a wheel controller communicably connected the computer system, one or more wheels operatively connected to the wheel controller, the computer system causing the robotic vehicle to navigate by controlling the wheels and based on information received from the plurality of sensors and at least one support assembly, each support assembly being operatively connecting one of the one or more wheels to a chassis of the robotic vehicle. A given support assembly comprises a first arm portion and a second arm portion, the first arm portion being attachable to the chassis of the robotic vehicle at an attachment point and projecting forwardly relative to the attachment point in a current direction of travel of the robotic vehicle and downwardly toward a ground surface on which the robotic vehicle navigates, the second arm portion being pivotably connected with the first arm portion at an arm pivot point, the second arm portion extending forwardly relative to the arm pivot point in the current direction of travel of the robotic vehicle, a corresponding wheel on which the support assembly is connected being rotatably mounted on one end of the second arm portion opposed to the arm pivot point, said wheel being rotatable around a wheel rotation axis, the wheel rotation axis being positioned at least as high as the arm pivot point relative to a surface on which the robotic vehicle is positioned.

In some embodiments of the robotic vehicle, the wheel rotation axis is positioned at least as high as the arm pivot point relative to a surface includes the wheel rotation axis being positioned at a same level with the arm pivot point relative to a substantially flat surface on which the robotic vehicle.

In some embodiments of the robotic vehicle, each support assembly further comprises a biasing element configured for limiting an angular range of movement of the second arm portion relative to the first arm portion.

In some embodiments of the robotic vehicle, each support assembly further comprises a biasing element configured for dampening an angular range of movement of the second arm portion relative to the first arm portion.

In some embodiments of the robotic vehicle, the biasing element comprises at least two resisting members, the at least two resisting members cooperating to dampen a rotation of the second arm portion around the arm pivot point.

In some embodiments of the robotic vehicle, the biasing element is a composite spring element.

In some embodiments of the robotic vehicle, the composite spring element is made from a fiberglass material.

In some embodiments of the robotic vehicle, the second arm portion pivots upwardly at the arm pivot point during climbing of an obstacle.

In some embodiments of the robotic vehicle, the second arm portion pivots downwardly at the arm pivot point during the climbing of the obstacle.

In some embodiments of the robotic vehicle, the one or more wheels is a plurality of wheels, the plurality of wheels comprising two wheels facing a current direction of movement of the robotic vehicle, the robotic vehicle comprising a support assembly on each one of said two wheels.

In some embodiments of the robotic vehicle, the plurality of wheels is arranged in a plurality of rows, each row being aligned with a current direction of movement of the robotic vehicle, the robotic vehicle comprising a support assembly disposed on outermost wheels of the plurality of rows, the support assemblies disposed on wheels facing said current direction projecting forwardly with respect to said current direction, the support assemblies disposed on remaining outermost wheels projecting oppositely with respect to said current direction.

In yet another broad aspect of the present technology, there is provided a method for overcoming an obstacle for a robotic vehicle, the robotic vehicle comprising a computer system, and a plurality of sensors communicably connected the computer system, a processor communicably connected to the computer system, and a plurality of wheels operatively connected to the processor, a support assembly disposed on one or more wheels of the plurality of wheels, the one or more wheels being disposed on a frontside of the robotic vehicle, said frontside being defined by a direction of a movement of the robotic vehicle. The method comprises causing, by the processor, the plurality of wheels to receive a coupling force to rotate along corresponding wheel rotations axes, thereby causing the robotic vehicle to navigate on a surface, the support assembly being in a rest position, causing, by the processor and upon the one or more wheels encountering an obstacle, the one or more wheels to traverse the obstacle, thereby causing a rotation of the second arm portion at the arm pivot point, causing, by a biasing element configured for dampening an angular range of movement of the second arm portion relative to the first arm portion, the robotic vehicle to tilt and causing, by the biasing element and once the robotic vehicle has traversed the obstacle, the support assembly to return to the rest position.

In some embodiments of the method, the obstacle is a step such that the robotic vehicle goes from a lower surface to a higher surface, and causing, by the processor and upon the one or more wheels encountering an obstacle, the one or more wheels to traverse the obstacle, thereby causing a rotation of the second arm portion at the arm pivot point comprises causing, by the processor and upon the one or more wheels abutting the step, the one or more wheels to climb the obstacle, thereby causing an upward rotation of the second arm portion at the arm pivot point.

In some embodiments of the method, causing, by a biasing element configured for dampening an angular range of movement of the second arm portion relative to the first arm portion, the robotic vehicle to tilt, comprises causing, by the biasing element, a downward rotation of the second arm portion at the arm pivot point.

In some embodiments of the method, the obstacle is a step such that the robotic vehicle goes from a higher surface to a lower surface, and causing, by the processor and upon the one or more wheels encountering an obstacle, the one or more wheels to traverse the obstacle, thereby causing a rotation of the second arm portion at the arm pivot point comprises causing, by the processor and upon the one or more wheels going down the step, the one or more wheels to reach the lower surface, thereby causing a downward rotation of the second arm portion at the arm pivot point.

In some embodiments of the method, causing, by a biasing element configured for dampening an angular range of movement of the second arm portion relative to the first arm portion, the robotic vehicle to tilt comprises dampening, by the biasing element, an upward rotation of the second arm portion at the arm pivot point.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
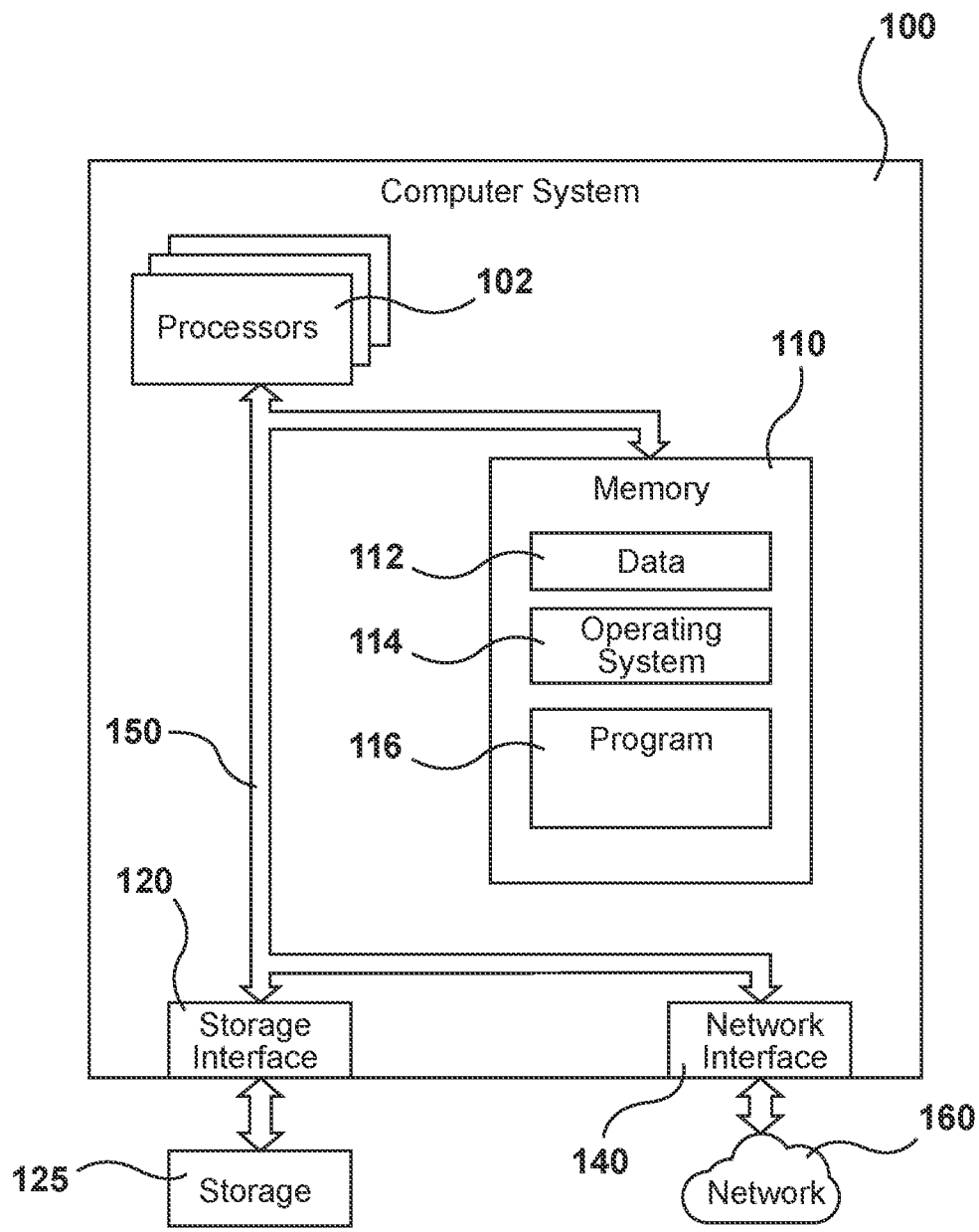
FIG. 1 depicts a schematic diagram of an example computer system for use in some implementations of systems and/or methods of the present technology.

Various representative implementations of the disclosed technology will be described more fully hereinafter with reference to the accompanying drawings. The present technology may, however, be implemented in many different forms and should not be construed as limited to the representative implementations set forth herein. In the drawings, the sizes and relative sizes of layers and regions may be exaggerated for clarity. Like numerals refer to like elements throughout.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. By contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative implementations and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The functions of the various elements shown in the figures, including any functional block labeled as a "processor," may be provided through the use of dedicated hardware as well as hardware capable of executing software. When provided by a processor, the functions may be provided by a single dedicated processor, by a single shared processor, or by a plurality of individual processors, some of which may be shared. In some implementations of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, an application-specific integrated circuit (ASIC), a field-programmable gate array (FPGA), a read-only memory (ROM) for storing software, a random-access memory (RAM), and non-volatile storage. Other hardware, conventional and/or custom, may also be included.

Software modules, or simply modules or units which are implied to be software, may be represented herein as any combination of flowchart elements or other elements indicating the performance of process steps and/or textual description. Such modules may be executed by hardware that is expressly or implicitly shown. Moreover, it should be understood that a module may include, for example, but without limitation, computer program logic, computer program instructions, software, stack, firmware, hardware circuitry, or a combination thereof, which provides the required capabilities.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

At least some aspects of the present technology may be implemented as a system, a method, and/or a computer program product. The computer program product may include a computer-readable storage medium (or media) storing computer-readable program instructions that, when executed by a processor, cause the processor to carry out aspects of the disclosed technology. The computer-readable storage medium may be, for example, an electronic storage device, a magnetic storage device, an optical storage device, an electromagnetic storage device, a semiconductor storage device, or any suitable combination of these. A non-exhaustive list of more specific examples of the computer-readable storage medium includes: a portable computer disk, a hard disk, a random-access memory (RAM), a read-only memory (ROM), a flash memory, an optical disk, a memory stick, a floppy disk, a mechanically or visually encoded medium (e.g., a punch card or bar code), and/or any combination of these. A computer-readable storage medium, as used herein, is to be construed as being a non-transitory computer-readable medium. It is not to be construed as being a transitory signal, such as radio waves or other freely propagating electromagnetic waves, electromagnetic waves propagating through a waveguide or other transmission media (e.g., light pulses passing through a fiber-optic cable), or electrical signals transmitted through a wire.

It will be understood that computer-readable program instructions can be downloaded to respective computing or processing devices from a computer-readable storage medium or to an external computer or external storage device via a network, for example, the Internet, a local area network, a wide area network and/or a wireless network. A network interface in a computing/processing device may receive computer-readable program instructions via the network and forward the computer-readable program instructions for storage in a computer-readable storage medium within the respective computing or processing device.

Computer-readable program instructions for carrying out operations of the present disclosure may be assembler instructions, machine instructions, firmware instructions, configuration data for integrated circuitry, or either source code or object code written in any combination of one or more programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network.

All statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable program instructions. These computer-readable program instructions may be provided to a processor or other programmable data processing apparatus to generate a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowcharts, flow diagrams, state transition diagrams, pseudo-code, and the like.

The computer-readable program instructions may also be loaded onto a computer, other programmable data processing apparatus or other devices to cause a series of operational steps to be performed on the computer, other programmable apparatus or other devices to generate a computer-implemented process, such that the instructions which execute on the computer, other programmable apparatus, or other device implement the functions/acts specified in the flowcharts, flow diagrams, state transition diagrams, pseudo-code, and the like.

In some alternative implementations, the functions noted in flowcharts, flow diagrams, state transition diagrams, pseudo-code, and the like may occur out of the order noted in the figures. For example, two blocks shown in succession in a flowchart may, in fact, be executed substantially concurrently, or the blocks may sometimes be executed in the reverse order, depending upon the functionality involved. It will also be noted that each of the functions noted in the figures, and combinations of such functions can be implemented by special-purpose hardware-based systems that perform the specified functions or acts or by combinations of special-purpose hardware and computer instructions.

With these fundamentals in place, we will now consider some non-limiting examples to illustrate various implementations of aspects of the present disclosure.

Computer System

FIG. 1 depicts a computer system 100 implemented in accordance with a non-limiting embodiment of the present technology. The computer system 100 may be a laptop computer, a tablet computer, a smartphone, an embedded control system, or any other computer system currently known or later developed. Additionally, it will be recognized that some or all the components of the computer system 100 may be virtualized and/or cloud-based. As shown in FIG. 1, the computer system 100 includes one or more processors 102, a memory 110, a storage interface 120, and a network interface 140. These system components are interconnected via a bus 150, which may include one or more internal and/or external buses (not shown) (e.g. a PCI bus, universal serial bus, IEEE 1394 "Firewire" bus, SCSI bus, Serial-ATA bus, etc.), to which the various hardware components are electronically coupled.

The memory 110, which may be a random-access memory or any other type of memory, may contain data 112, an operating system 114, and a program 116. The data 112 may be any data that serves as input to or output from any program in the computer system 100. The operating system 114 may be an operating system such as Microsoft Windows™ or Linux™. The program 116 may be any program or set of programs that include programmed instructions that may be executed by the processor to control actions taken by the computer system 100.

The storage interface 120 is used to connect storage devices, such as the storage device 125, to the computer system 100. One type of storage device 125 is a solid-state drive, which may use an integrated circuit assembly to store data persistently. A different kind of storage device 125 is a hard drive, such as an electro-mechanical device that uses magnetic storage to store and retrieve digital data. Similarly, the storage device 125 may be an optical drive, a card reader that receives a removable memory card, such as an SD card, or a flash memory device that may be connected to the computer system 100 through, e.g., a universal serial bus (USB).

In some implementations, the computer system 100 may use well-known virtual memory techniques that allow the programs of the computer system 100 to behave as if they have access to a large, contiguous address space instead of access to multiple, smaller storage spaces, such as the memory 110 and the storage device 125. Therefore, while the data 112, the operating system 114, and the programs 116 are shown to reside in the memory 110, those skilled in the art will recognize that these items are not necessarily wholly contained in the memory 110 at the same time.

The processors 102 may include one or more microprocessors and/or other integrated circuits. The processors 102 execute program instructions stored in the memory 110. When the computer system 100 starts up, the processors 102 may initially execute a boot routine and/or the program instructions that make up the operating system 114.

The network interface 140 is used to connect the computer system 100 to other computer systems or networked devices (not shown) via a network 160. The network interface 140 may include a combination of hardware and software that allows communicating on the network 160. In some implementations, the network interface 140 may be a wireless network interface. The software in the network interface 140 may include software that uses one or more network protocols to communicate over the network 160. For example, the network protocols may include TCP/IP (Transmission Control Protocol/Internet Protocol).

It will be understood that the computer system 100 is merely an example and that the disclosed technology may be used with computer systems or other computing devices having different configurations.

Robotic Vehicle

Figure 2:
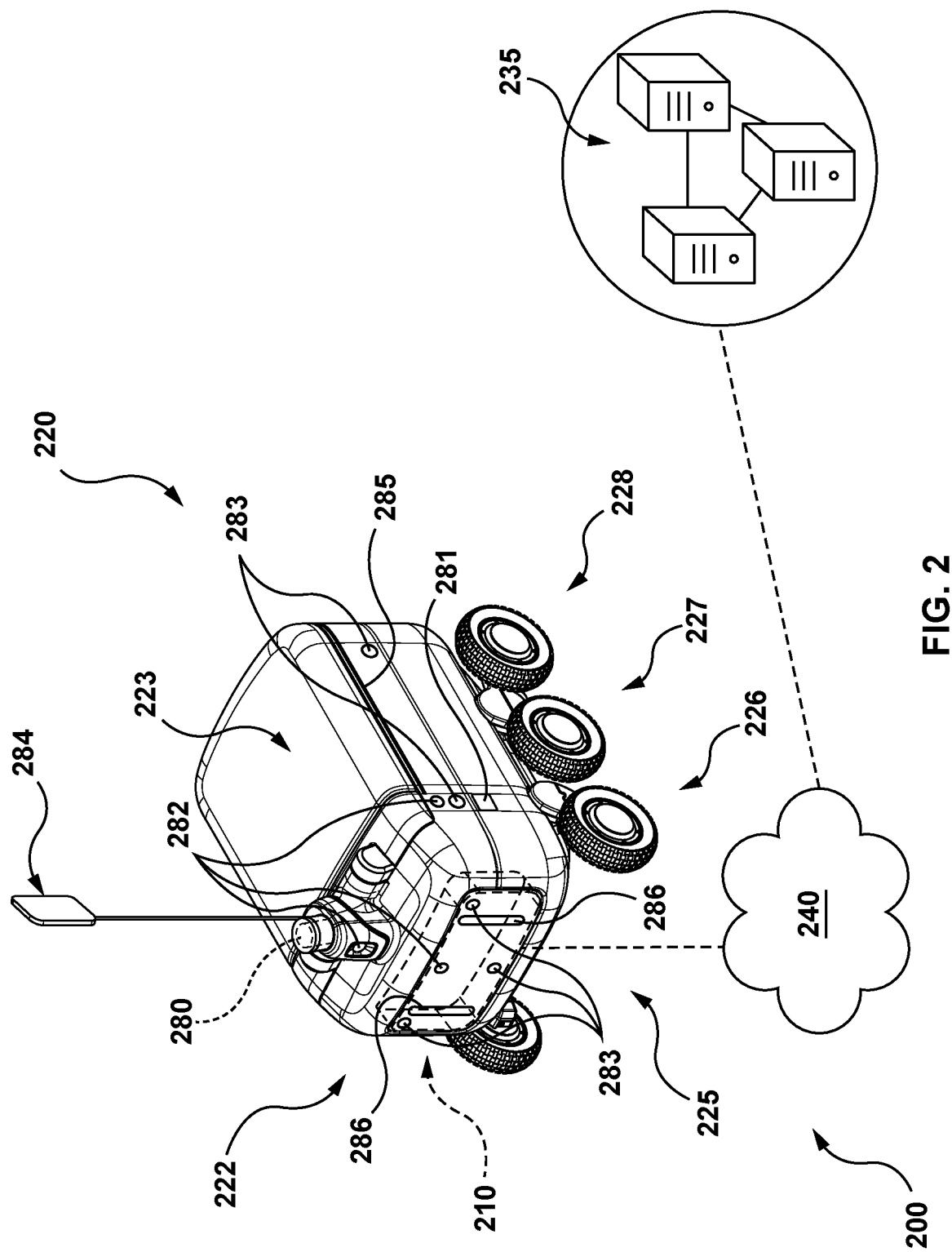
FIG. 2 depicts an electronic device of a robotic vehicle communicatively coupled to a server in accordance with some embodiments of the present technology.

FIG. 2 depicts a networked environment 200 suitable for use with some non-limiting implementations of the present technology. The environment 200 includes a computing device 210 associated with a robotic vehicle 220. The environment 200 also includes one or more servers 235 in communication with the computing device 210 via a communication network 240 (e.g. the Internet or the like).

Figure 3:
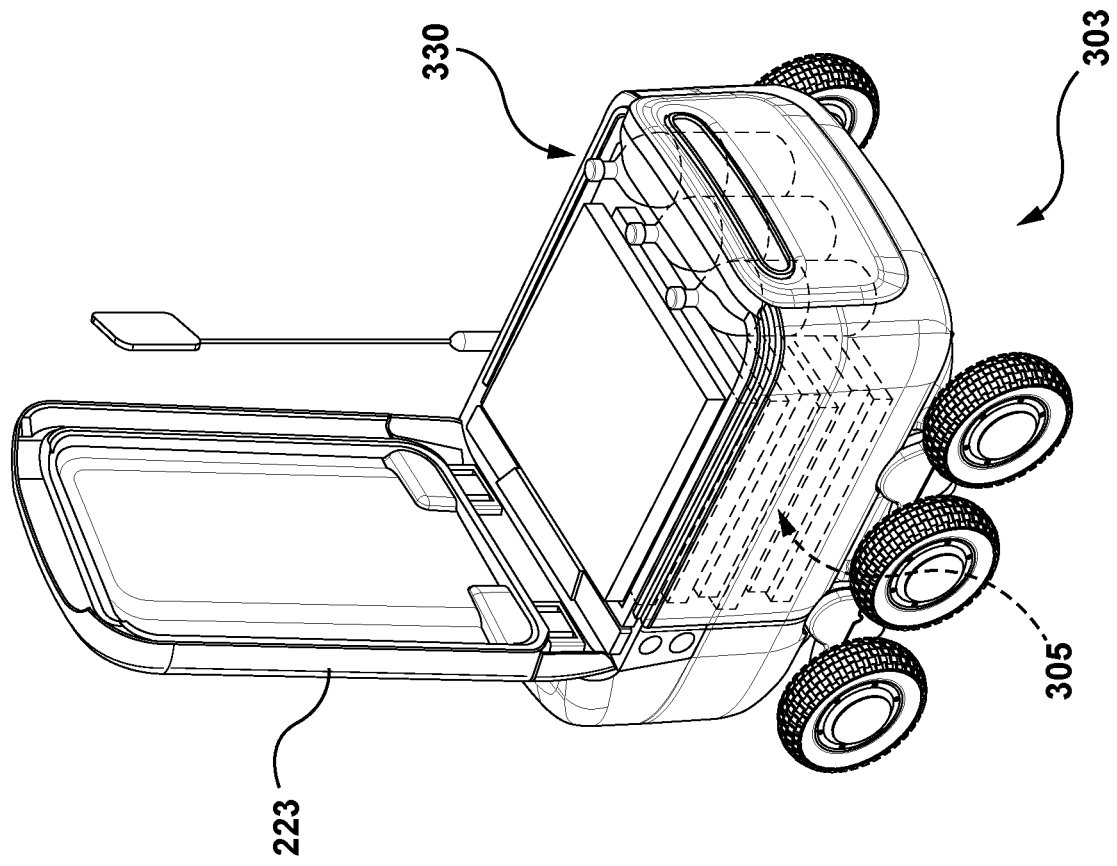
FIG. 3 there is depicted a representation of the robotic vehicle with a lid in an opened position and a representation of the robotic vehicle with the lid in a closed position.
Figure 3:
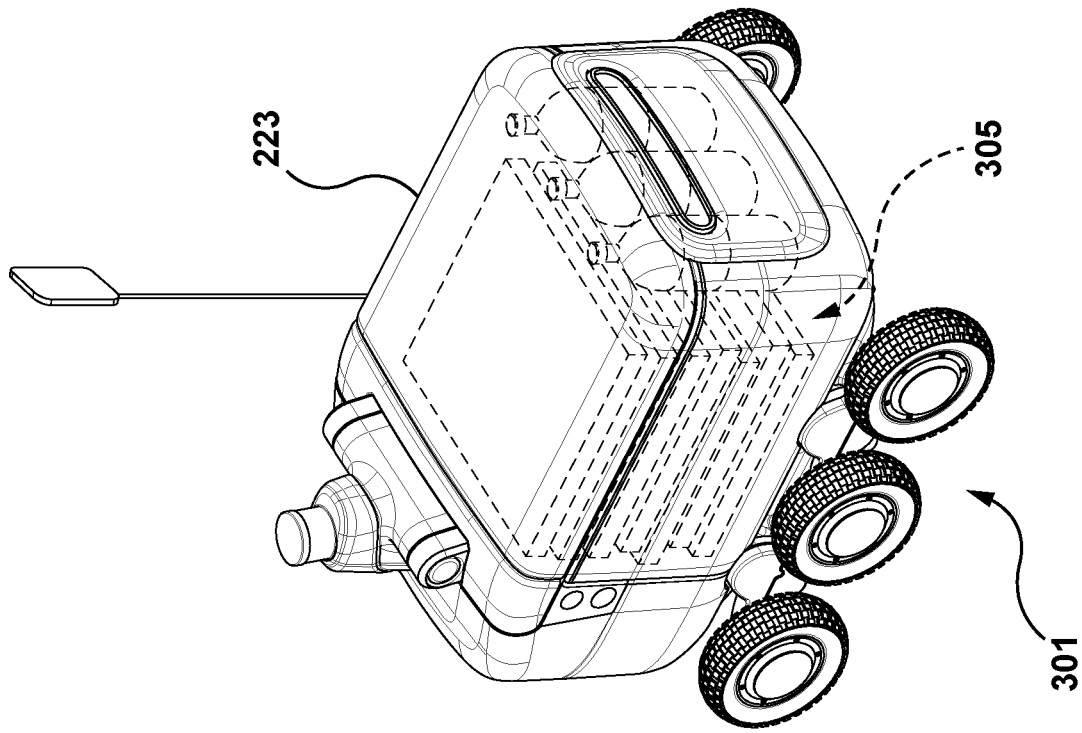

As can be seen the robotic vehicle 220 can comprise a body 222 and a lid 223. Other configurations for different applications are also possible. The robotic vehicle 220 shown can be particularly used for the transfer of deliveries (such as mail, groceries, parcels, packages, flowers, medical equipment and/or purchases). With a brief reference to FIG. 3, there is depicted a representation 301 of the robotic vehicle 220 with the lid 223 in an opened position and a representation 303 of the robotic vehicle 220 with the lid 223 in a closed position. When the lid 223 is in an opened position, access to an interior storage space 307 is provided for placing and/or removing items 305.

Returning to the description of FIG. 2, a chassis 225 is arranged at the bottom of the robotic vehicle 220. As can be seen in the embodiment shown three sets or pairs of wheels are provided—that is, wheels 226, wheels 227 and wheels 228. The robotic vehicle 220 also comprises illumination/signaling elements 284, 285 and 286 that are used for providing visual information to person(s) in the surroundings of the robotic vehicle 220. It is contemplated that a variety of systems and components of the robotic vehicle 220 may be attached to the chassis 225, such as, but not limited to: a suspension system, a battery, exterior panels, electronic components, and a body frame. In some implementations, the chassis 225 may be fabricated from aluminum. In other implementations, both the body 222 and the chassis 225 may be fabricated from a fiberglass material.

In one implementation, the robotic vehicle 220 may have a weight of 70 kg when empty. In another implementation, the robotic vehicle may operate at a top speed of 8 km/h. In a further implementation, the robotic vehicle 220 may have a ground clearance at full load of 100 mm.

The robotic vehicle 220 may be a fully autonomous vehicle that may, in use, travel independently from any human decision, or a partially autonomous vehicle, in which a human operator can selectively remotely control some aspects of the robotic vehicle's operation, while other aspects are automated or where the human operator controls the operations under certain conditions (such as when the robotic vehicle 220 is stuck and cannot determine in an autonomous regime how to move forward). As one non-limiting example, the robotic vehicle 220 may operate autonomously unless or until it encounters an unexpected or unusual situation that it is unable to handle autonomously, at which time a remote human operator could be contacted. It should be noted that specific parameters of the robotic vehicle 220 are not limiting, these specific parameters including for example: manufacturer, model, year of manufacture, vehicle weight, vehicle dimensions, vehicle weight distribution, vehicle surface area, vehicle height, motor type, tire type (if tires are used), power system, or other characteristics or parameters of a vehicle. The robotic vehicle 220, to which the computing device 210 is associated, could be any robotic vehicle, for delivery applications, warehouse applications, or the like.

In at least some non-limiting implementations of the present technology, the computing device 210 is communicatively coupled to control systems of the robotic vehicle 220. The computing device 210 could be arranged and configured to control different operation systems of the robotic vehicle 220, including but not limited to: motor control, steering systems, and signaling and illumination systems.

In some non-limiting implementations of the present technology, the networked computing environment 200 could include a GPS satellite (not depicted) transmitting and/or receiving a GPS signal to/from the computing device 210. It will be understood that the present technology is not limited to GPS and may employ a positioning technology other than GPS. It should be noted that the GPS satellite can be omitted altogether.

According to the non-limiting embodiments of the present technology, the implementation of the computing device 210 is not particularly limited. For example, the computing device 210 could be implemented as a vehicle motor control unit, a vehicle CPU, a computer system built into the robotic vehicle 220, a plug-in control module, and the like. Thus, it should be noted that the computing device 210 may or may not be permanently associated with the robotic vehicle 220.

The computing device 210 can include some or all of the components of the computer system 100 depicted in FIG. 1, depending on the particular implementation of the present technology. In certain implementations, the computing device 210 is an on-board computer device and includes the processors 102, the storage device 125 and the memory 110. In other words, the computing device 210 includes hardware and/or software and/or firmware, or a combination thereof, for processing data and performing a variety of actions in response to the processed data. For example, the computing device 210 may receive data from one or more sensors and/or the server 235, process the received data, and trigger movement of the robotic vehicle 220 based on the processed data.

In some non-limiting implementations of the present technology, the communication network 240 is the Internet. In alternative non-limiting implementations of the present technology, the communication network 240 can be implemented as any suitable local area network (LAN), wide area network (WAN), a private communication network or the like. It should be expressly understood that implementations for the communication network 240 are for illustration purposes only. A communication link (not separately numbered) is provided between the computing device 210 and the communication network 240, the implementation of which will depend, inter alia, on how the computing device 210 is implemented. Merely as an example and not as a limitation, the communication link can be implemented as a wireless communication link. Examples of wireless communication links may include, but are not limited to, a 3G communication network link, a 4G communication network link, and the like. The communication network 240 may also use a wireless connection with the servers 235.

In some implementations of the present technology, the servers 235 can be implemented as computer servers and could include some or all of the components of the computer system 100 of FIG. 1. In one non-limiting example, the servers 235 are implemented as a Dell™ PowerEdge™ Servers running the Microsoft™ Windows Server™ operating system but can also be implemented in any other suitable hardware, software, and/or firmware, or a combination thereof.

In some non-limiting implementations of the present technology, the processors 102 of the computing device 210 could be in communication with the servers 235 to receive one or more updates. Such updates could include, but are not limited to, software updates, map updates, route updates, geofencing updates, weather updates, and the like. In some non-limiting implementations of the present technology, the computing device 210 can also be configured to transmit to the servers 235 certain operational data, such as routes traveled, traffic data, performance data, and the like. Some or all such data transmitted between the robotic vehicle 220 and the servers 235 may be encrypted and/or anonymized.

It should be noted that a variety of sensors and systems may be used by the computing device 210 for gathering information about surroundings of the robotic vehicle 220. The robotic vehicle 220 is equipped with a plurality of sensors (not numbered). It should be noted that different sensor systems may be used for gathering different types of data regarding the surroundings of the robotic vehicle 220. It is contemplated that a plurality of different sensor systems may be used in combination by the robotic vehicle 220, without departing from the scope of the present technology.

In the non-limiting example illustrated in FIG. 2, the robotic vehicle 220 includes a LIDAR system 280 that mounted to the robotic vehicle 220 and communicatively coupled to the computing device 210. Broadly speaking, a LIDAR system is configured to capture data about the surroundings of the robotic vehicle 220 used, for example, for building a multi-dimensional map of objects in the surroundings of the robotic vehicle 220. More specifically, the LIDAR system 280 may determine location and distance of objects based reflection of transmitted light energy using pulsed laser light. Upon hitting an object with a transmitted lased pulse, the pulse is reflected back to a sensor of the LIDAR system 280. The object distance may then be calculated by measuring the pulse travel time. Typical LIDAR systems may generate rapid pulses of laser light at rates of up to several hundred thousand pulses per second. In most cases, the energy of automotive lidar beams is limited to eye-safe level of Class 1 laser product.

In at least some embodiments, the LIDAR system 280 comprises laser diodes to generate the laser beams, photodiodes to receive the returning (i.e. reflected) signals, and a servo-mounted mirror device to direct the laser beam horizontally and vertically. The generated laser pulses are guided through the mirror device actuated by a servo-motor. The mirror device may be adjusted to transmit pulses at different vertical and/or horizontal angles. An optical encoder provides feedback to the servo motor to enable precise control of the mirror and the resulting laser transmission. The returning signals are captured by the photodiodes and processed by a signal processing unit of the LIDAR system 280. The LIDAR system 280 may generate a series of point cloud data representative of the detected objects, with associated information about the measured distance and location in 3D coordinates relative to the LIDAR system 280.

In one embodiment, the LIDAR system 280 can be implemented as a rotational LIDAR system emitting sixty-four (64) light beams, however other configurations are envisioned without departing from the scope of the present technology. For example, one or more LIDAR systems could be mounted to the robotic vehicle 220 in a variety of locations and/or in a variety of configurations for gathering information about surroundings of the robotic vehicle 220.

As alluded to above, the computing device 210 can be configured to detect one or more objects in the surroundings of the robotic vehicle 220 based on data acquired from one or more camera systems and from one or more LIDAR systems. For example, the computing device 210 configured to detect a given object in the surroundings of the robotic vehicle 220 may be configured to identify LIDAR data and camera data associated with the given object, generate an "embedding" representative of features associated with the given object, and detect the object by generating a bounding box for the object.

In the non-limiting example illustrated in FIG. 2, the robotic vehicle 220 includes radar systems 281 that are mounted to the robotic vehicle 220 and communicatively coupled to the computing device 210. Broadly speaking, the one or more radar systems may be configured to make use of radio waves to gather data about various portions of the surroundings of the robotic vehicle 220. For example, the one or more radar systems may be configured to gather radar data about potential objects in the surroundings of the robotic vehicle 220, such data potentially being representative of a distance of objects from the radar systems, orientation of objects, velocity and/or speed of objects, and the like.

More specifically, the radar systems 281 may employs radio waves, i.e. electromagnetic wavelengths longer than infrared light, to detect and track objects. Said radar systems 281 may emit pulses of radio waves that are reflected off objects surrounding the robotic vehicle 220, thereby causing returning waves providing information on the direction, distance and estimated size of each object in the surrounding of the robotic vehicle 220. The radar system 281 may also be used to determine a direction and speed of an object's movement by releasing multiple consecutive pulses. The radar system 281 may for example comprise two echo radar devices disposed in different positions on the robotic vehicle 220, such as to capture additional information on an object's position, such at an angle of the object. The radar system 281 may analyze wave phases (e.g. such as a Doppler radar) by keeping track of each particular wave and detecting differences in the position, shape, and form od the wave when it returns from the object to the radar system 281. The received information can further be used to determine whether the wave has undergone a positive or negative shift. A negative shift means that the object is most likely moving away from the radar system 281, while a positive shift indicates that the object is moving toward the radar system 281. A value of said shift may be used to determine the speed of the object.

In the non-limiting example illustrated in FIG. 2, the robotic vehicle 220 includes camera sensors 282 that are mounted to the robotic vehicle 220 and communicatively coupled to the computing device 210. Broadly speaking, the one or more camera sensors may be configured to gather image data about various portions of the surroundings of the robotic vehicle 220. In some cases, the image data provided by the one or more camera sensors could be used by the computing device 210 for performing object detection procedures. For example, the computing device 210 could be configured to feed the image data provided by the one or more camera sensors to an Object Detection Neural Network (ODNN) that has been trained to localize and classify potential objects in the surroundings of the robotic vehicle 220.

In some embodiments, one or more camera sensors may be equipped with fisheye lenses with a viewing angle of more than 180 degrees. It is contemplated that one or more camera sensors may be located on the robotic vehicle 220 and oriented in a manner that at least a portion of the robotic vehicle 220 is visible by the one or more camera sensors. In further embodiments, one or more camera sensors may be equipped with long-focus lenses. For example, a front-facing camera sensor may be equipped with such a lens for better "seeing" traffic lights on an opposite side of a street to be crossed.

In the non-limiting example illustrated in FIG. 2, the robotic vehicle 220 includes ultrasonic sensors 283 that are mounted to the robotic vehicle 220 and communicatively coupled to the computing device 210. Broadly speaking, an ultrasonic sensor is an instrument that measures the distance to an object using ultrasonic sound waves. Such sensors may include uses a transceiver to send and receive ultrasonic pulses that relay back information about an object's proximity. Sound waves produced by one or more ultrasonic sensors may reflect from boundaries to produce distinct echo patterns. In some embodiments, one or more ultrasonic sensors of the robotic vehicle 220 may provide an indication of a distance of a given object, and an echogram. It is contemplated that such information may be leveraged for adjusting action triggering thresholds depending on inter alia different weather conditions and road surfaces.

More specifically, ultrasonic sensors 283 may use these high frequency acoustic waves for object detection and ranging. In use, the ultrasonic sensors 283 transmit packets of waves and determine a travel time for said waves to be reflected on an object and return back to the ultrasonic sensors 283. In most cases, the acoustic waves used in ultrasonic sensors are non-audible to humans, because the waves are transmitted with high amplitude (>100 dB) for the sensors to receive clear reflected waves. In some implementations, the ultrasonic sensors 283 comprises a transmitter, which converts an electric alternating current (AC) voltage into ultrasound, and a receiver, which generates AC voltage when a force is applied to it.

In at least some embodiments, the robotic vehicle 220 further comprises an inertial measurement unit including motion sensors such as accelerometers (e.g. capacitive accelerometers, piezoelectric accelerometers, or any other suitable accelerometers), gyroscopes (e.g. mechanical gyroscopes, optical gyroscopes, Micro Electro-Mechanical System gyroscopes, or any other suitable gyroscopes) and magnetometers to determine a position and characteristics of movements of the robotic vehicle 220. For example, the inertial measurement unit may comprise three gyroscopes and three accelerometers providing six degree-of-freedom pose estimation capabilities. Additionally, the inertial measurement unit may comprise three magnetometers to provide a nine degree-of freedom estimation.

Figure 4:
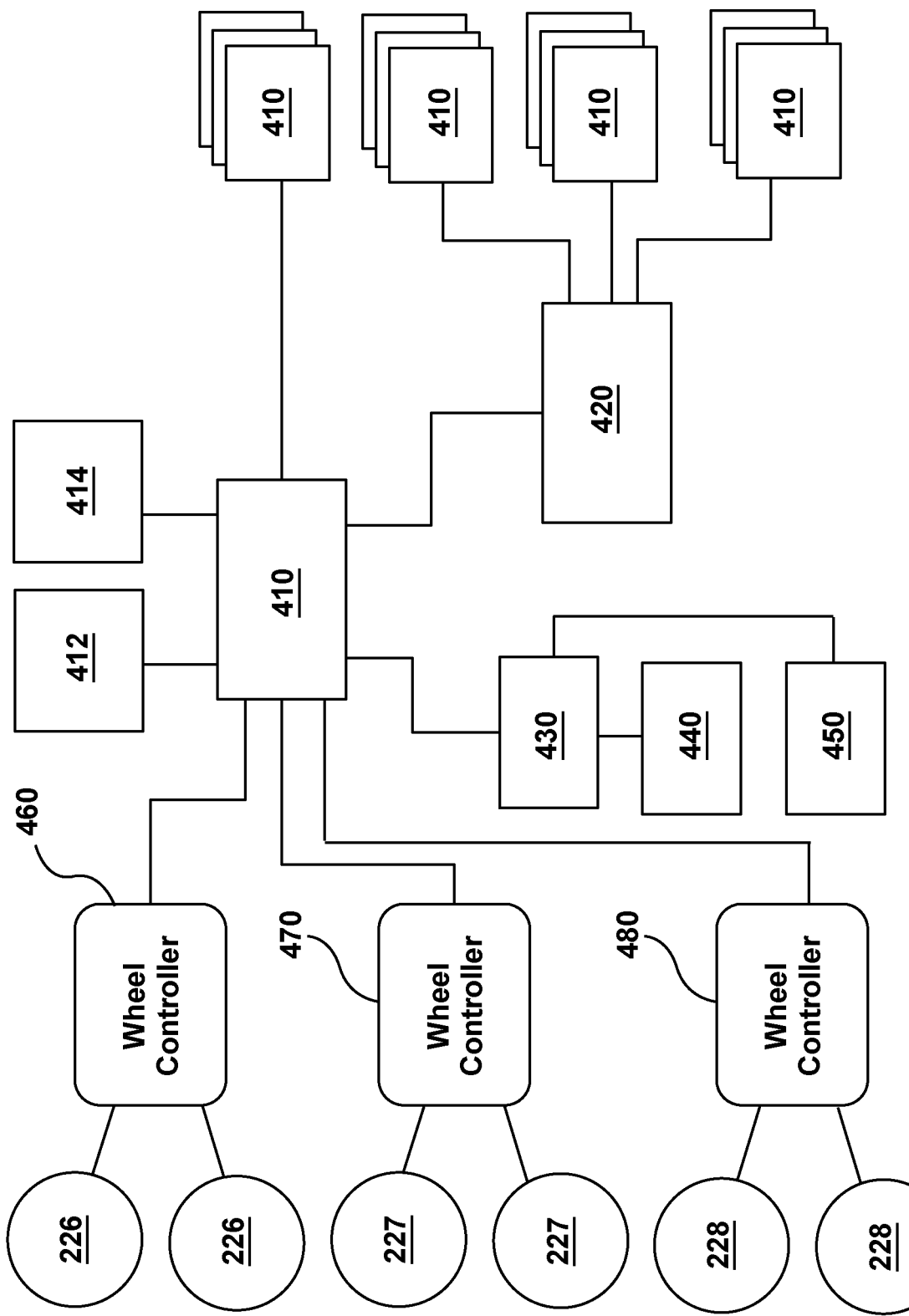
FIG. 4 is a schematic diagram of electronic components that can be used for operating the robotic vehicle.

With reference to FIG. 4, there is depicted a schematic diagram 400 of electronic components that can be used for operating the robotic vehicle 220. It is contemplated that the computing device 210 may include one or more electronic components including: a main controller 420, a platform controller 410, a peripheral controller 430, and a plurality of wheel controllers 460, 470, 480. In some alternative non-limiting embodiments, functionality of some or all of the computing device 210, the main controller 420, the platform controller 410, the peripheral controller 430, and the plurality of wheel controllers 460, 470, 480 may be combined into one or more computing devices.

The wheel controllers may be implemented as dedicated processors. It is contemplated that one or more electronic components of the robotic vehicle 220 may be located inside a common and/or respective sealed enclosures. In some implementations, communication between various electronic components may be provided via Controller Area Network (CAN) buses. In his embodiment, and in addition to the CAN buses, some communications between the various electronic components, and notably between the main controller 420 and the computing device 210, is based on Ethernet communication protocol. It is also contemplated that some electronic components may be provided power at voltage battery (VBAT), while other electronic components may be provided power at 12 volts. Furthermore, transmission of information among the various electronic component involves signal converters for converting information received at one of the electronic components in a suitable format (e.g. digital signals, discrete signals and/or analog signals).

Broadly speaking, the main controller 420 is in a sense the "brain" of the robotic vehicle 220. The main controller 420 is a computer system configured to execute one or more computer-implemented algorithms for recognizing objects (such as people, cars, obstacles, for example), plan trajectory of movement of the robotic vehicle, localize the robotic vehicle 220 in its surroundings, and so forth. The main controller 420 may comprise a router through which other components can be connected to a single on-board network. In one implementation, video data from camera sensors 282, LIDAR data from the LIDAR system 280, and radar data from the radar systems 281 may be provided to the main controller 420.

Broadly speaking, the platform controller 410 is configured to power one or more electronic components of the robotic vehicle 220. For example, the platform controller 410 may be configured to control current limits on respective power branches, switch power to an auxiliary battery 414 when a main battery 412 is removed and/or is being replaced. It is also contemplated that the platform controller 410 may be configured to generate wheel control commands and collect data from the ultrasonic sensors 283. Alternatively, ultrasonic data may be collected by one or more other controllers inside the robotic vehicle 220 without departing from the scope of the present technology.

Broadly speaking, the peripheral controller 430 is configured to control one or more peripheral systems of the robotic vehicle 220. For example, the peripheral controller 430 may be configured to control a lid system 440 and a lighting system 450 of the robotic vehicle 220. More specifically, the lid system 440 comprises the lid 223 and a motor operatively connected to the lid 223. The lid system 440 may also comprise sensors to detect a position of the lid 223, a rotation speed of the motor of the lid 223, and/or any other information relative to actuation of the lid 223. As such, the peripheral controller 430 may for example control the motor of the lid 223 to lock and unlock the lid 223. The lighting system 450 comprises the illumination/signaling elements 284, 285 and 286 that are used for providing visual information to person(s) in the surroundings of the robotic vehicle 220. As such, the peripheral controller 430 may for example control visual signals provided by the one or more visual indications (e.g. illumination/signaling elements 284, 285 and 286) of the robotic vehicle 220.

Broadly speaking, the wheel controllers 460, 470 and 480 are configured to control operation of respective wheels of the robotic vehicle 220. In some embodiments, the robotic vehicle 220 may comprise motor-wheels (or "in-wheel motors") for driving the wheels. More specifically, each motor-wheel operates a corresponding wheel and is implemented into a hub of the corresponding wheel to drive said wheel directly. The motor-wheels may be implemented in the robotic vehicle instead of a motor located inside the body 222. In this embodiment, each wheel comprises an electronic unit, said electronic unit comprising a processor that may be communicably connected to the computing device 210, a microcontroller (e.g. a corresponding motor-wheel) connected to said processor, or any other computing device. Implementation of the motor-wheels may provide more room in the body 222 and may reduce risk of over-heating other components inside the body 222 due to thermal energy expelled by the motor. For example, a given wheel controller may receive speed values for respective wheels from the platform controller 410 and may control currents in the windings of the motor-wheels, for example, so as to provide the desired speed in a variety of driving conditions.

Robotic Vehicle Operation

At least some aspects of the present technology may provide navigation and/or motion planning for operating the robotic vehicle 220 in the surroundings and which includes both static and dynamic (i.e., moving) objects. The robotic vehicle 220 may navigate and move in urban and/or suburban settings for delivering goods, packages, boxes, and/or other parcels. The robotic vehicle 220 may navigate in outdoor environments (e.g. streets, crosswalks, field). Because of the tasks that it performs, the robotic vehicle 220 may be configured to travel along sidewalks and footways. Thus, the motion planning module in the robotic vehicle considers the behavior of pedestrians moving along or crossing its path. Additionally, the robotic vehicle 220 may cross roads. Cars and other vehicles moving on roads in urban and/or suburban settings may not notice small-sized robotic vehicles, for example, which may lead to collisions that could damage or destroy the robotic vehicle 220 and its cargo. Consequently, the motion planning module for the robotic vehicle 220 may consider objects in a roadway, including, e.g. moving and parked cars and other vehicles.

The robotic vehicle 220 may also navigate in indoor environments such as offices, warehouses, convention centers, or any other indoor environments where the robotic vehicle 220 is requested to navigate. Thus, the motion planning module in the robotic vehicle considers the behavior of human entities and non-human entities (e.g. animals) moving along or crossing its path.

For a delivery vehicle, one important goal may be to deliver a parcel from a starting point to a destination by a particular time. Thus, the motion planning module may consider the speed of the robotic vehicle 220 and determine that adequate progress is being made toward the destination. These considerations are particularly relevant when the delivery tasks are time-critical or when the destination is remote.

For purposes of illustration, the robotic vehicle 220 uses the LIDAR system 280. The computing device 210 associated with the robotic vehicle 220 receives data from the sensors and may generate a 3D map of points (point cloud). This 3D map of points may be used by the robotic vehicle to inter alia obtain a distance from surrounding objects and to determine a trajectory and speed.

It is contemplated that the robotic vehicle 220 may also make use of a 3D map representation that is provided thereto by the servers 235. For example, the 3D map representation of an environment in which the robotic vehicle 220 is to operate may be "built" on the servers 235 and may be accessible remotely by the robotic vehicle 220, without departing from the scope of the present technology. Additionally, or alternatively, the 3D map representation of the environment may also be transmitted, at least in part, to the robotic vehicle 220 for local storage and local access purposes.

It should be noted that the servers 235 may collect information from one or more robotic vehicles (e.g., a fleet) that are tasked with mapping the environment, thereby generating respective 3D map representations of a given region. For example, one or more robotic vehicles may generate a 3D map representation of a street, a block, a municipality, a city, and a like. This information may be collected by the servers 235 for unifying information from the one or more robotic vehicles into a 3D map representation to be used during operation of the robotic vehicle 220. It is contemplated that a 3D map representation used by the robotic vehicle 220 for navigation and motion planning may have a system of coordinates for locating various objects found in the environment such as poles, mailboxes, curbs, roads, buildings, fire hydrants, traffic cones, traffic lights, crosswalks, trees, fences, billboards, landmarks, and the like. As another example, the one or more robotic vehicles may generate a 3D map representation of an office, one or more floors of a building, a mall, a convention center, a warehouse, a datacenter or any other indoor environments suitable for navigation of the one or more robotic vehicles. It is contemplated that a 3D map representation used by the robotic vehicle 220 for navigation and motion planning may have a system of coordinates for locating various objects found in the environment such as furniture, doors, racks, stairs, staircases, shops, elevators, and the like.

Obstacles

The developers of the present technology have realized that robotic vehicles operating in urban and/or suburban settings encounter a variety of obstacles that may need to be overcome in order to proceed to destination. In some cases, a robotic vehicle may navigate around such obstacles, but in other cases, the robotic vehicle may need to overcome the obstacle. These obstacles may include curbs, cobble stones, steps, and the like. To that end, the developers of the present technology have devised means for a robotic vehicle for overcoming obstacles in urban and/or suburban settings.

Figure 5:
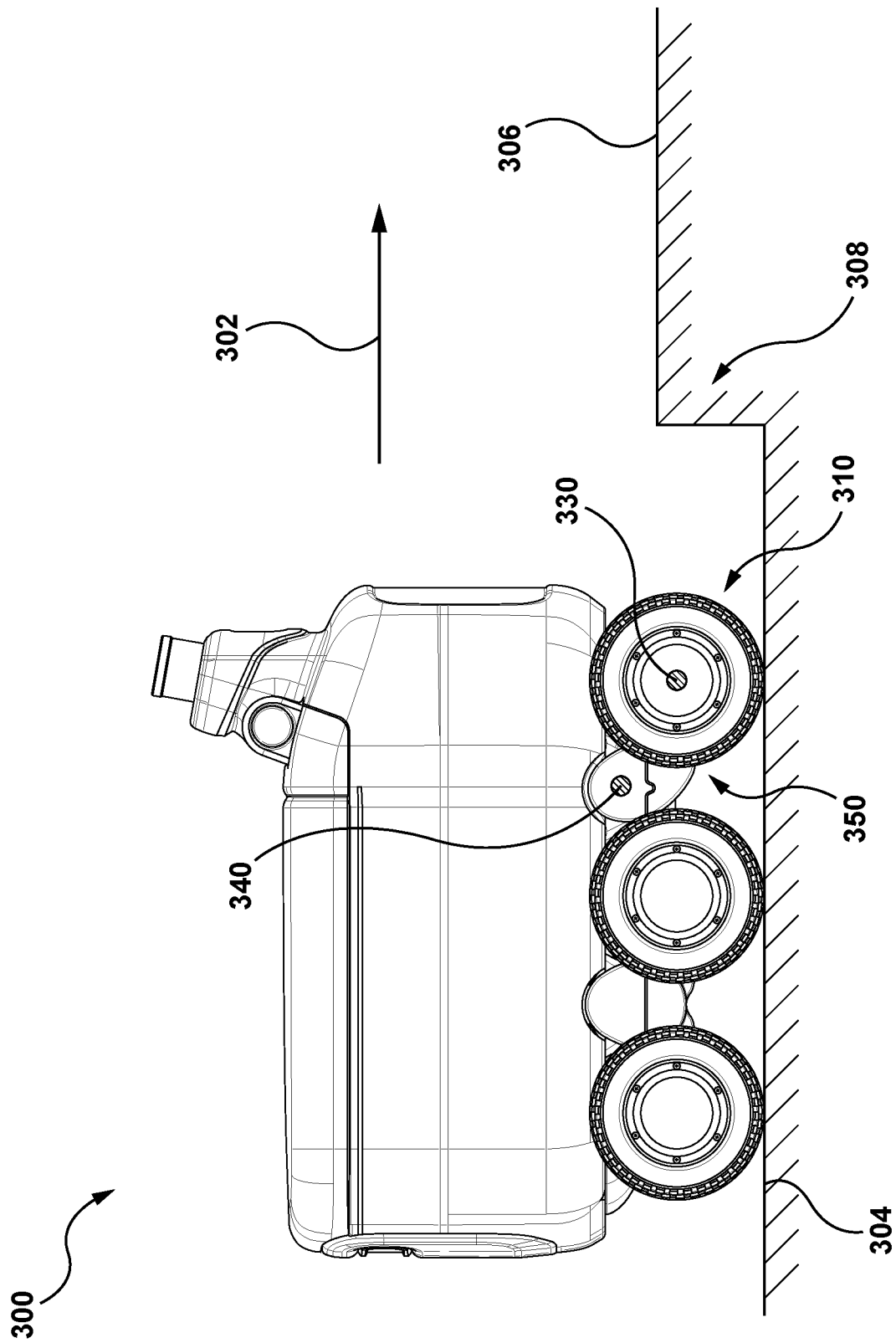
FIG. 5 depicts a right-side elevation view of a robotic vehicle about to climb an obstacle.

To better illustrate this, reference will now be made to FIG. 5 depicting a robotic vehicle 300 that encounters an obstacle in a form of a step 308. It is contemplated that some or all components of the robotic vehicle 300 may be implemented in a similar manner to components of the robotic vehicle 220 of FIG. 2. In one example, the robotic vehicle 300 may need to climb the step 308, by moving in a current direction 302 of travel, thereby transitioning from the lower surface 304 to a higher surface 306.

The developers of the present technology have devised a wheel system with a support assembly 350 for a wheel 310 and which facilitates climbing of the step 308. The support assembly, also referred herein as an "arm assembly", is attached to the robotic vehicle 300 at an attachment point 340. For example, the arm assembly 350 may be fixedly attached to a suspension system (not numbered) of the robotic vehicle 220. In another example, the arm assembly 350 may be fixedly attached to a front axle (not numbered) of the robotic vehicle 220 passing through the attachment point 340. The wheel 310 is rotationally attached to the arm assembly 350 at a wheel attachment point 330, through which passes a wheel rotation axis 335 of the wheel 310.

Various components of the arm assembly 350 and how the arm assembly 350 is configured to operate during climbing of the step 308 will now be described in turn with reference to FIGS. 6 to 12.

Arm Assembly

Figure 6:
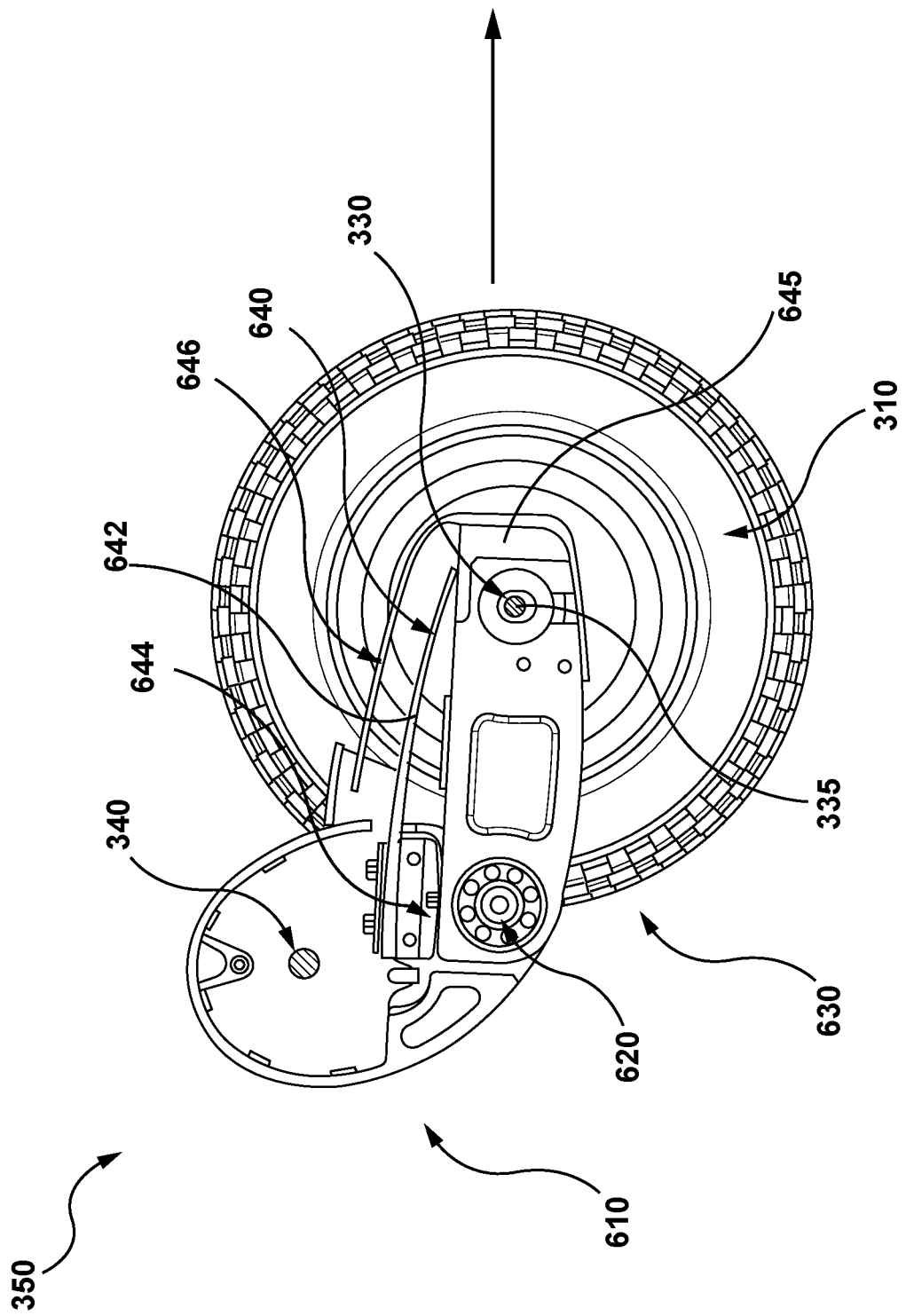
FIG. 6 depicts a right-side elevation view of a front wheel and an arm assembly of the robotic vehicle of FIG. 3, without the robotic vehicle.

With reference to FIG. 6, there is depicted a right-side elevation view of the arm assembly 350, with the rest of the robotic vehicle 300 being omitted for sake of simplicity except the wheel 310. As depicted, the arm assembly 350 comprises a first arm portion 610 and a second arm portion 630.

The first arm portion 610, also herein referred to as a "shoulder element", is attachable to a static part of the robotic vehicle 300. For example, it is attachable to a chassis of the robotic vehicle 300 at the attachment point 340. Yet in another example, the first arm portion 610 can be attached to a frame of the robotic vehicle 300 at the attachment point 340. It is contemplated that the shoulder element 610 does not move with respect to the attachment point 340 when the robotic vehicle 300 is in motion nor when the robotic vehicle 300 overcomes an obstacle (e.g. climbing the step 308). The second arm portion 630, also herein referred to as a "forearm element", is pivotably connected to the shoulder element 610 and has the corresponding wheel 310 mounted thereto at the wheel rotation axis.

It is contemplated that the forearm element 630 is configured to move with respect to the shoulder element 610 during climbing of the step 308 via rotation about a pivot point 620, also herein referred to as an "elbow point" of the arm assembly 350. The elbow point 620 may comprise one or more bearings (e.g., rolling-element bearings) for pivotably connecting the shoulder element 610 to the forearm element 630. In alternative embodiments, the elbow point 620 may comprise alternative mechanical components providing a pivot connection between the shoulder element 610 and the forearm element 630. Thus, the elbow point 620 provides an angular range of movement of the forearm element 630 relative to the shoulder element 610.

In the non-limiting example of FIG. 6, the arm assembly 350 further comprises a biasing element 640 for limiting and/or dampening the angular range of movement of the forearm element 630 relative to the shoulder element 610. In some embodiments, the biasing element 640 may comprise a composite spring component. The spring element may be, for example, fabricated from a fiberglass material. Alternatively, the biasing element 640 may be implemented in any other form, for example, in the form of a stopper arm, without departing from the scope of the present technology.

More specifically, in this embodiment, the biasing element 640 comprises a first resisting member 642 and a second resisting member 644 fixedly attached to the shoulder element 610 (or extending therefrom). The second resisting member 644 has two inclined surfaces at its bottom portion, therefore said second resisting member 644 is configured to sway along an upper surface of the forearm element 630. Upon upward rotation of the forearm element 630 at the elbow point 620, the upper surface of the forearm element abuts the inclined surface of the second resisting member 644 and deforms its initial shape. The first resisting member 642 may then increase a contact pressure against the forearm element 630 and be deformed relative to a shape thereof at rest. The first resisting member 642 may further slide upon or slidably cooperate with a sliding member 645 of the forearm element 630. To do so, the first resisting member 642 may further comprise a sliding end cover (not shown) that facilitates the sliding. The first resisting member 642 thus additionally spring the movement of the forearm element 630. As a result, said deformations induce a biasing force in the biasing element 640 which results in a resisting force applied to the forearm element 630, thereby dampening the upward rotation of the forearm element 630 around the elbow point 620.

Similarly, upon downward rotation of the forearm element 630 at the elbow point 620, it abuts the inclined bottom surface of the second resisting member 644. The first resisting member 642 in turn enter in contact with and/or increase a contact pressure against a surface of a dust cover element 646. The first resisting member 642 is thus elongated and the second resisting member 644 is deformed relative to a shape thereof at rest. As a result, said deformations induces a biasing force in the biasing element 640 which results in a resisting force applied to the forearm element 630, thereby dampening the downward rotation of the forearm element 630 around the elbow point 620.

In other words, in this embodiment, the first and second resisting members 642, 644 cooperate to dampen the rotation of the forearm element 630 around the elbow point 620. In some embodiments, the first and second resisting members 642, 644 cooperate to limit a rotation range of the forearm element 630 around the elbow point 620.

In the non-limiting example of FIG. 6, the arm assembly 350 further comprises the dust cover element 646 for limiting and/or preventing any dust, dirty, stones or other fine particles coming into the inner space of the biasing element 640. Alternatively, the dust cover element 646 may be omitted without departing from the scope of the present technology.

When the arm assembly 350 is attached to the robotic vehicle 300, the elbow point 620 is positioned in a specific manner relative to the wheel attachment point 330 of the corresponding wheel 310. In some embodiments, the elbow point 620 may be positioned at a level of the wheel attachment point 330 (e.g., at a same height off the ground surface when the robotic vehicle 300 is static). In further embodiments, the wheel attachment point 330 may be located in a vertical range centered around a vertical position of the elbow point 620 above a surface on which the robotic vehicle 220 finds itself at rest. In some embodiments, the elbow point 620 can be vertically offset down from the wheel attachment point 330. For example, the vertical offset may be between 8 mm and 12 mm.

It should also be noted that the arm assembly 350 projects forwardly, in the forward current direction 302 of travel, relative to a vertical plane passing through the attachment point 340. This means that both the elbow point 620 and the wheel attachment point 330 are positioned forwardly from the attachment point 340. In some embodiments, it is contemplated that the arm assembly 350 (and/or the shoulder element 610) may have a forwardly projecting curved shape.

Developers of the present technology have realized that positioning the elbow point 620 of the arm assembly forwardly from the attachment point 340 of the shoulder element 610 and at a same level than the wheel attachment point 330 of the corresponding wheel 310 may facilitate the climbing of the robotic vehicle 300. As such, in this embodiment, the elbow point 620 is positioned forwardly from the attachment point 340 and at a same height than the wheel rotation axis relative to a substantially flat surface on which the robotic vehicle 300 is positioned when the arm assembly 350 is mounted on the robotic vehicle 300 (i.e. the arm assembly 350 supporting at least a portion of the weight of the robotic vehicle 300) and the robotic vehicle 300 is at rest or navigating on a substantially flat surface.

It should be noted that the elbow point 620 may not always be level with the wheel attachment point 330 during movement, such as when climbing, for example. How the arm assembly 350 operates during climbing of the step 308 will now be described with reference to FIGS. 7 to 12.

In this embodiment, the wheels of the robotic vehicle 300 are arranged in two parallel rows of wheels, each wheel of a first row being aligned, along a corresponding wheel rotation axis, with a corresponding wheel of a second row. Furthermore, wheels that face the current direction 302 of travel (that may be referred to as the "current front wheels") are connected to the rest of the robotic vehicle 300 by a respective arm assembly 350. It should be understood that a direction of the "forward" projection of the arm assembly 350 disposed on the current front wheels is defined in terms of the current direction of travel of the robotic vehicle.

As an example, the robotic vehicle may comprise, in an alternative embodiment, four arm assemblies 350. Two first arm assemblies 350 may connect two respective wheels that face the current direction 302 of movement (i.e. two current front wheels). As such, said two support assemblies project forwardly with respect to the current direction 302 of movement. Two second arm assemblies 350 may connect two respective wheels that face an opposite direction, said two support assemblies thus projecting rearward with respect to the current direction 302. As such, the two first and two second arm assemblies 350 project in opposite directions.

Robotic Vehicle Operation for Overcoming an Obstacle

When the robotic vehicle 300 is static, the shoulder element 610 and the forearm element 630 may form a reference angle at the elbow point 620. The reference angle may change during the movement of the robotic vehicle 300, especially when climbing an obstacle. During movement, the forearm element may be rotated about the elbow point 620 such that a current angle formed by the shoulder element 610 and the forearm element 630 is larger, or smaller, than the reference angle. In other words, it can be said that the angular range of movement of the forearm element 630 may include a first sub-range that is above the reference angle and a second sub-range that is below the reference angle. For example, the first sub-range and the second sub-range may be about 20 degrees.

Figure 7:
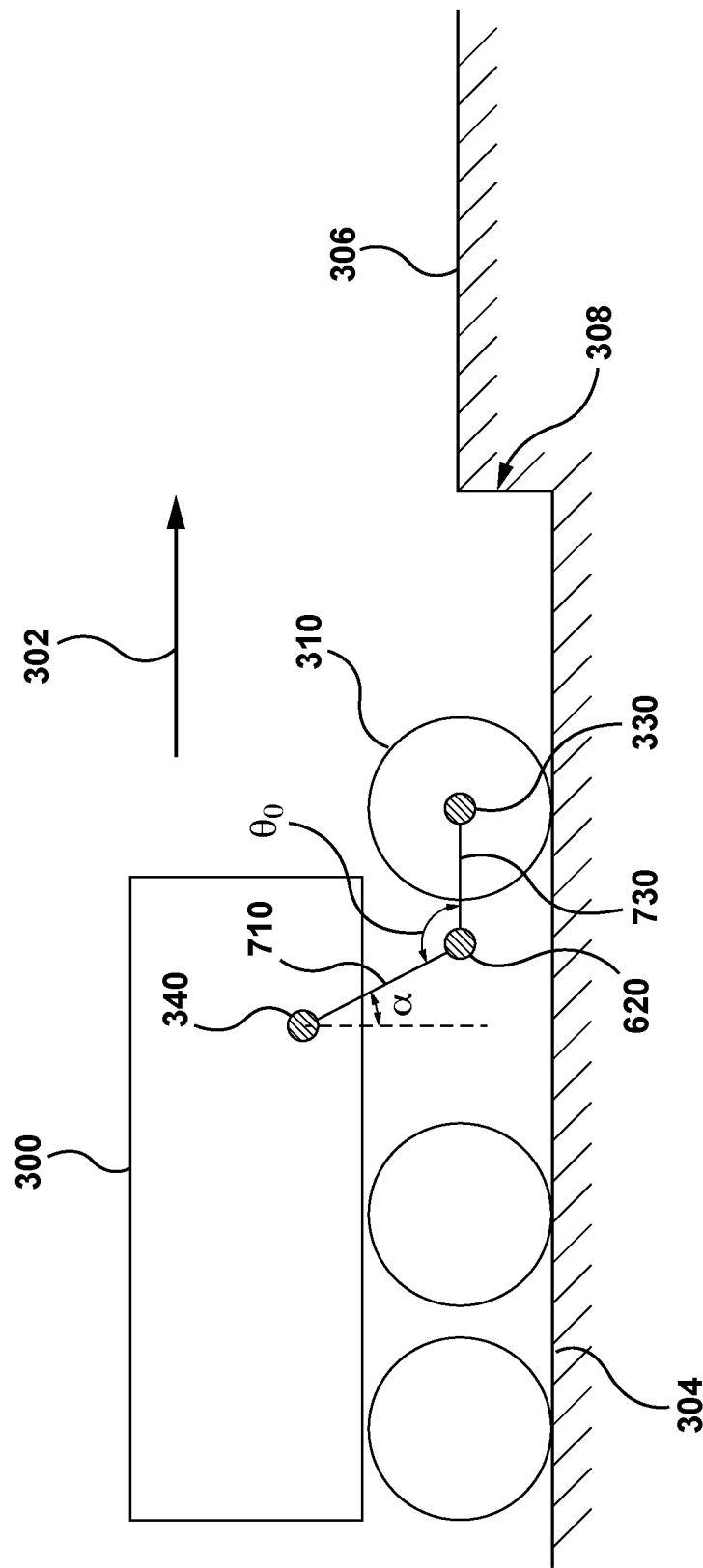
FIGS. 7 to 12 depict the robotic vehicle and the arm assembly at different timestamps during climbing of the obstacle.

With reference to FIG. 7, the robotic vehicle 300 approaches the step 308, also referred to as an obstacle, by moving forward in the current direction 302 of travel. As illustrated in FIG. 7, the robotic vehicle 300 navigates on the lower surface 304 that is a substantially flat surface. As such, in this embodiment, the elbow point 620 and the wheel attachment point 330 are at a same height relative to the lower surface 304.

As illustrated, a line 710 passing through the attachment point 340 and the elbow point 620 is oriented at an angle α with respect to a vertical axis. It is contemplated that the angle α may be more than zero degrees. In some embodiments, it is contemplated that the elbow point 620 is positioned forwardly from a vertical plane passing through the attachment point 340 and positioned downwardly from a horizontal plane passing through the attachment point 340. There is also illustrated a line 730 passing through the elbow point 620 and the wheel attachment point 330. This line 730 may extend parallel to the lower surface 304. Curved shape of the shoulder element 610 and/or of the forearm element 630 are contemplated. Moreover, in this position of the robotic vehicle 300, the line 710 and the line 730 form an angle θ at the elbow point 620, said angle θ being equal to a reference angle $θ_0$ in FIG. 7. In this embodiment, given that the elbow point 620 and the wheel attachment point 330 are at a same height relative to the lower surface 304, the reference angle $θ_0$ is: $θ_0=α+90°$. It can be said that the arm assembly 350 is forwardly projected given that the angle α is positive. In one embodiment, the angle $θ_0$ may be 110° when the assembly is loaded with the weight of the robotic vehicle.

Figure 8:
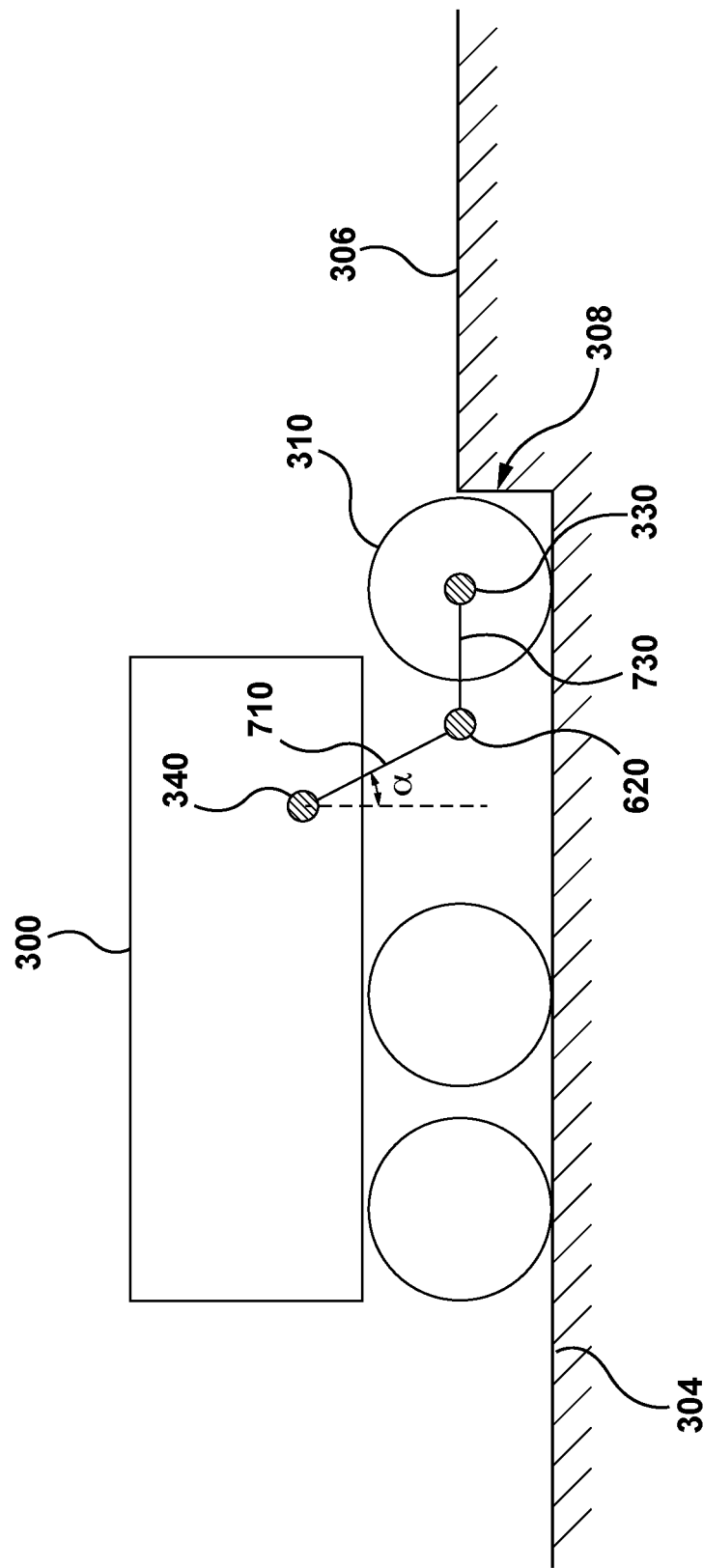

With reference to FIG. 8, the wheel 310 abuts the step 308, thereby causing resistance in the rotation of the wheel 310. In response, the computing device 210 may increase a rotation speed of the wheels of the robotic vehicle 300.

Figure 9:
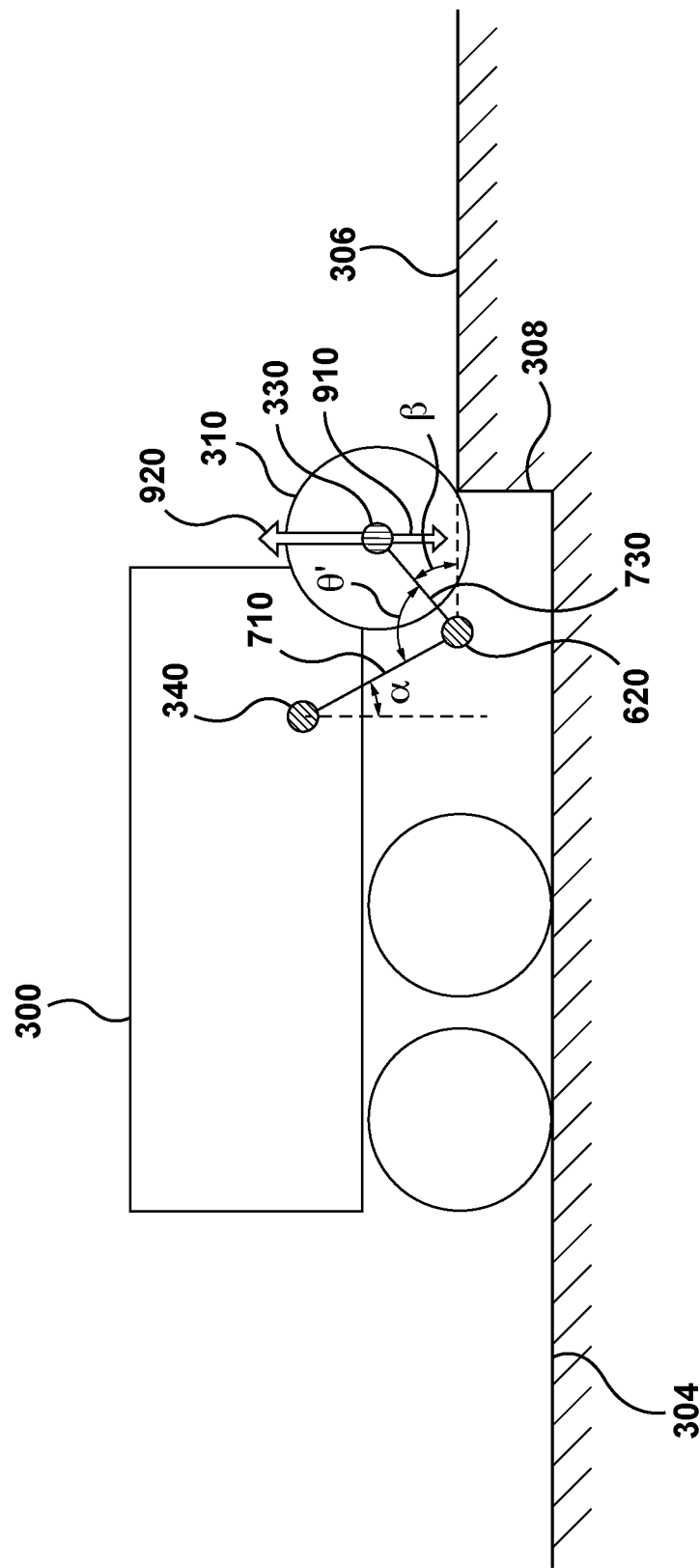

With reference to FIG. 9, adherence of the wheel 310 onto the step 308 causes the wheel 310 to roll along the step 308 (i.e. along a vertical direction in the illustrative example). It can be said that the wheel 310 "climbs", or "rolls up" the step 308. During this step, a gravitational force 910 that is no longer counterbalanced by normal reaction force of the lower surface 304 applies to the wheel 310. Upon the wheel 310 climbing the step 308, said gravitational force 910 is counterbalanced by a traction force 920 due to adherence of the wheel 310 onto the step 308 combined with a coupling force applied to the wheel 310 by a corresponding motor-wheel. The traction force 920 is made higher in norm compared to the gravitational force 910 such that the wheel 310 may climb the step 308. As the wheel 310 travels along the step 308, the angle θ between the line 710 and the line 730 at the elbow point 620 is reduced by an angle β, and which increases until it abuts against the second resisting member 644.

As previously described, in this embodiment, the arm assembly 350 comprises the biasing element 640. Therefore, a biasing force is induced in the biasing element 640 which results in a resisting force applied to the forearm element 630.

Figure 10:
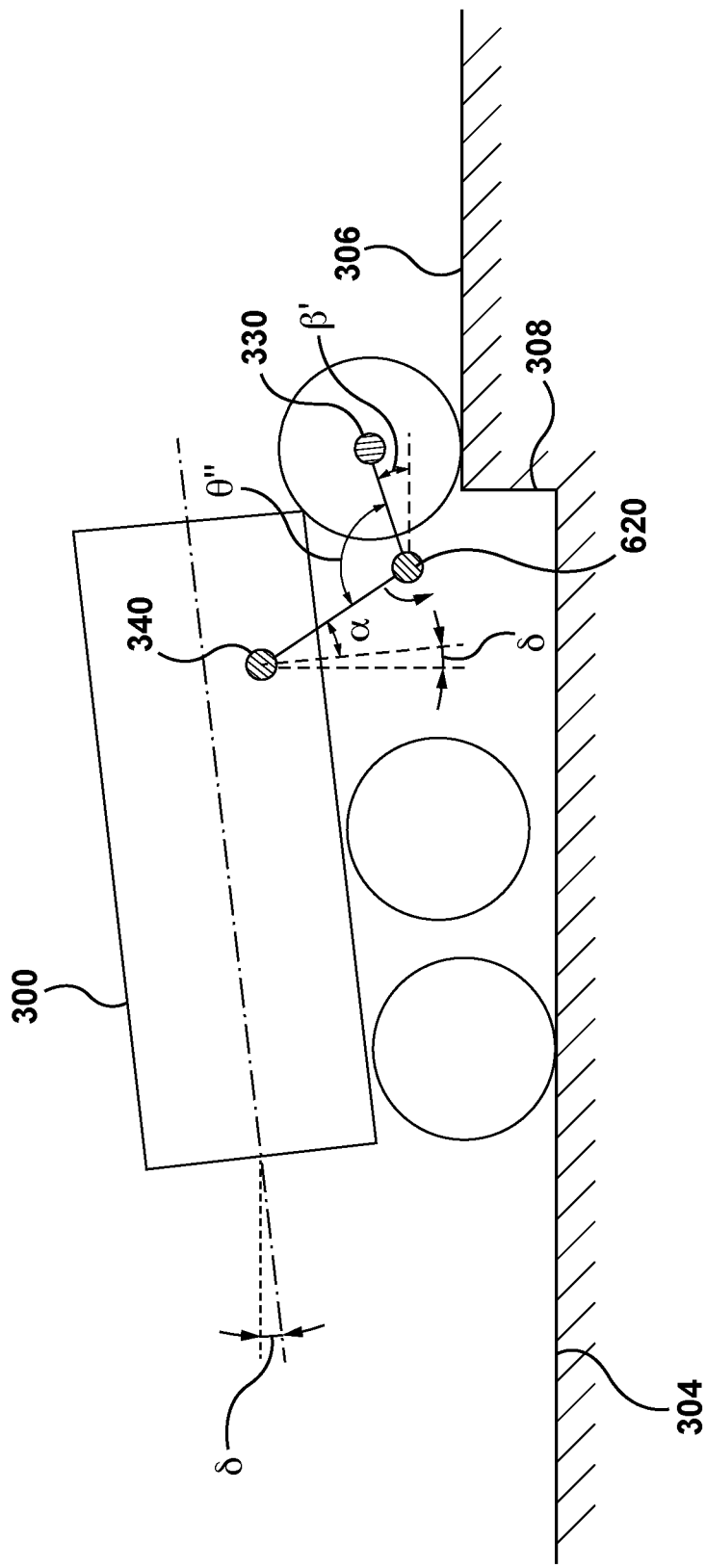

With reference to FIG. 10, the wheel 310 has reached the higher surface 306. As such, the gravitational force 910 is counterbalanced by a normal force of the higher surface 306. In some embodiments, a rotational speed of the wheels may be reduced in response to determination that the wheel 310 has reached the higher surface 306 (e.g. determination that the movement of the robotic vehicle 300 is no longer dampened).

Once the wheel 310 has reached the higher surface 306, the forces applied to the wheel 310 have no vertical components, such that the resisting force of the biasing element 640 is no longer counterbalanced. Therefore, the resisting force of the biasing element 640 causes the forearm element 630 to describe a downward rotation around the elbow point 620. The angle θ thus increases until a balance is found between the weight of the robotic vehicle 300 on the arm assembly 350 and reaches θ". Said balance is found when the angle β reaches the value β' on FIG. 10. It can be said that the angle θ is passively adjusted once the wheel 310 has reached the higher surface 306 given that said adjustment is caused by resisting forces of the biasing element 640. In this embodiment, the second resisting member 644 may limit the increase of said angle by dampening a downward rotation of the forearm element 630 at the elbow point 620.

Given that the shoulder element 610 has a fixed position relative to a body of the robotic vehicle 300 at the attachment point 340, increase of the angle θ causes the robotic vehicle 300 to tilt, or "rise", of an angle δ. Reference to the angle α in the FIGS. 7 to 12 is to indicate to a reader of the present disclosure that the orientation of the line 710 does not change during the steps of overcoming the obstacle.

Figure 11:
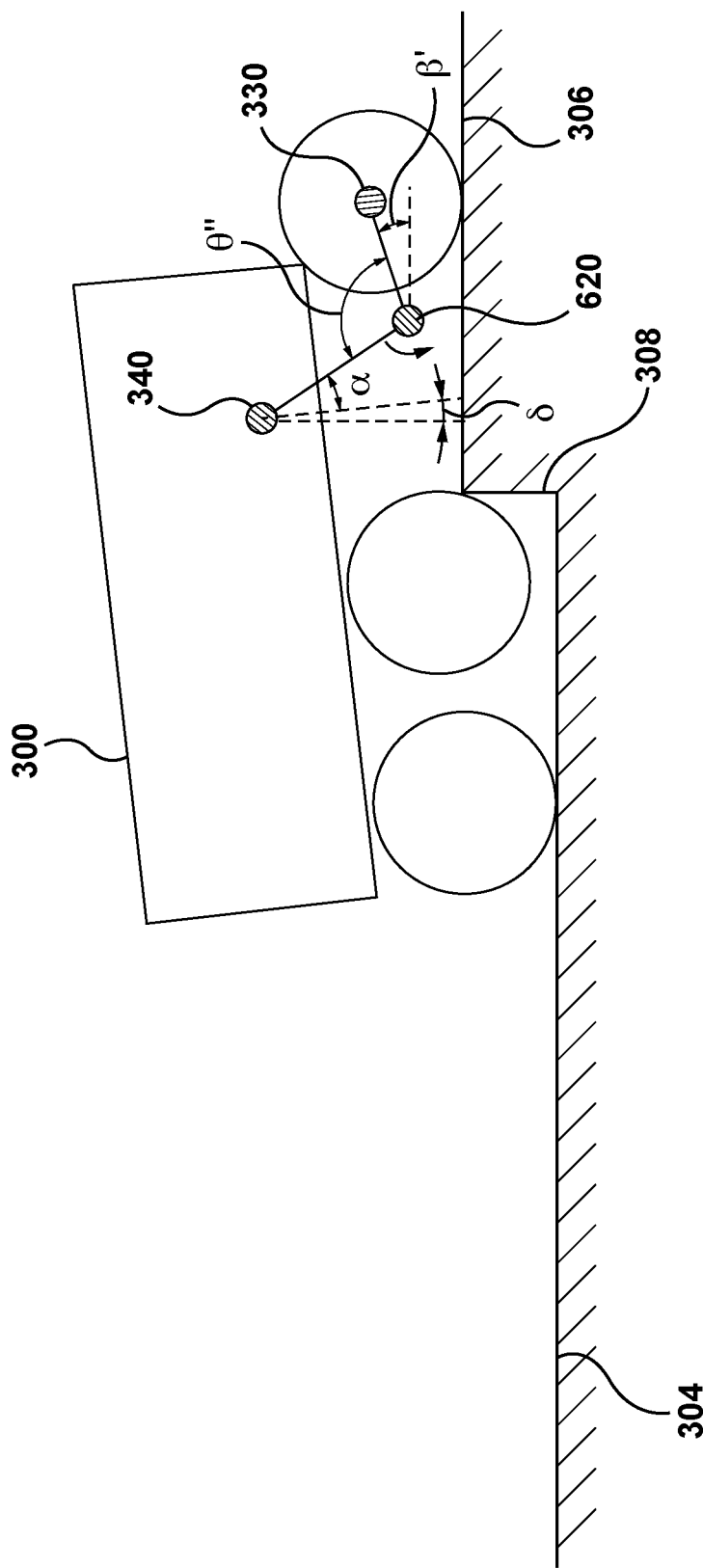

With reference to FIG. 11, the robotic vehicle 300 moves along the current direction 302 until subsequent wheels abut the step 308. In at least some embodiments, subsequent wheels are also mounted on a support assembly such as the arm assembly 350. In this embodiment, the subsequent wheels are at least partially towed by the wheel 310.

Figure 12:
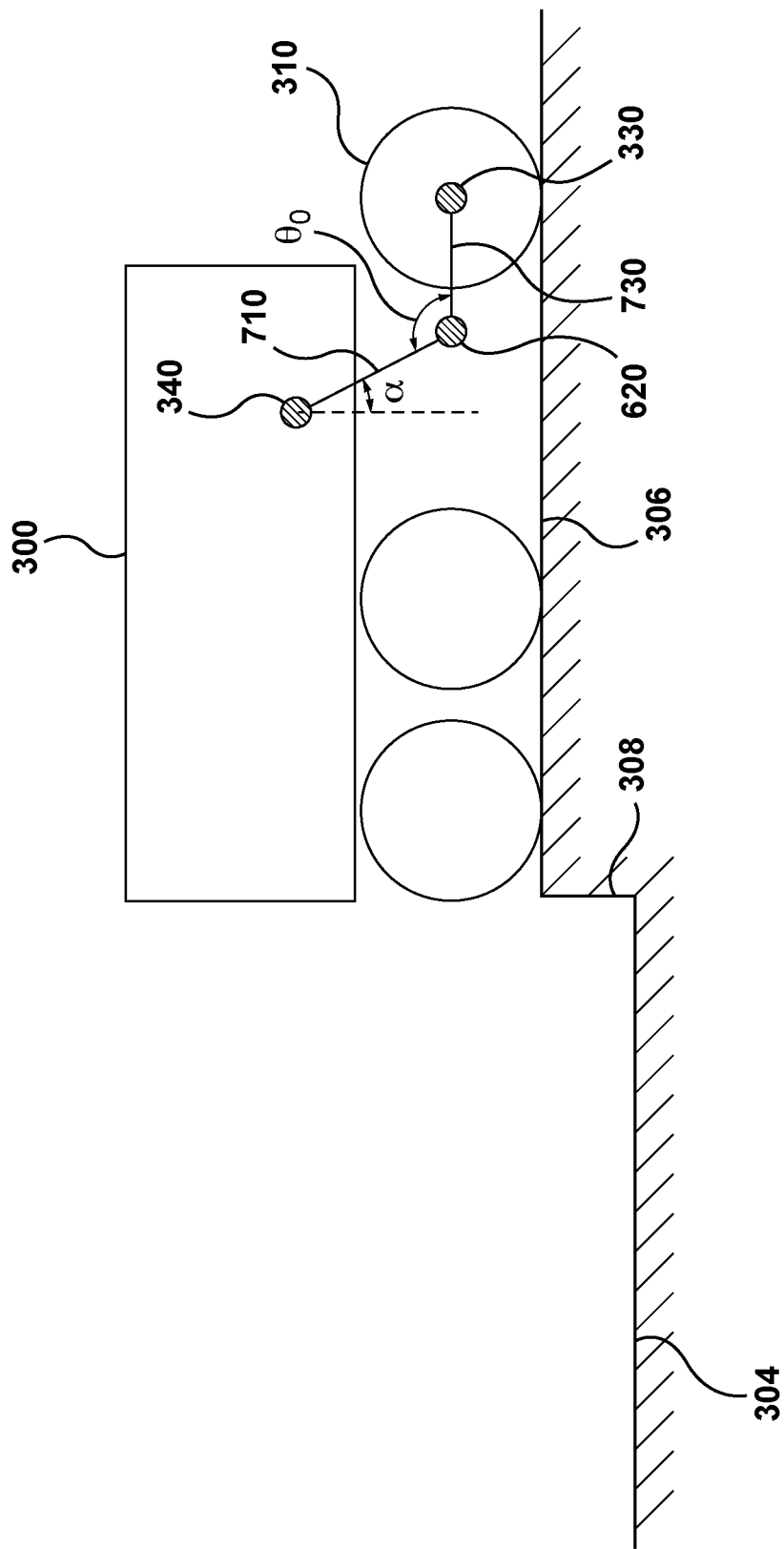

With reference to FIG. 12, the robotic vehicle has climbed on the higher surface 306 and the weight of the robotic vehicle 300 is redistributed on the wheels thereof, such that the angle θ is further readjusted to reach the reference angle $θ_0$.

It should be noted that the robotic vehicle 300 may also go down a step, from a higher surface to a lower surface. As the skilled person would readily understand, movements of the forearm element 630 are chronologically reversed compared to FIGS. 7 to 12. More specifically, the forearm element 630 may firstly described a downward rotation about the elbow point 620 until the wheel 310 reaches the lower surface or abuts against the second resisting member 644, and then an upward rotation once the other wheels have reached the lower surface.

Figure 13:
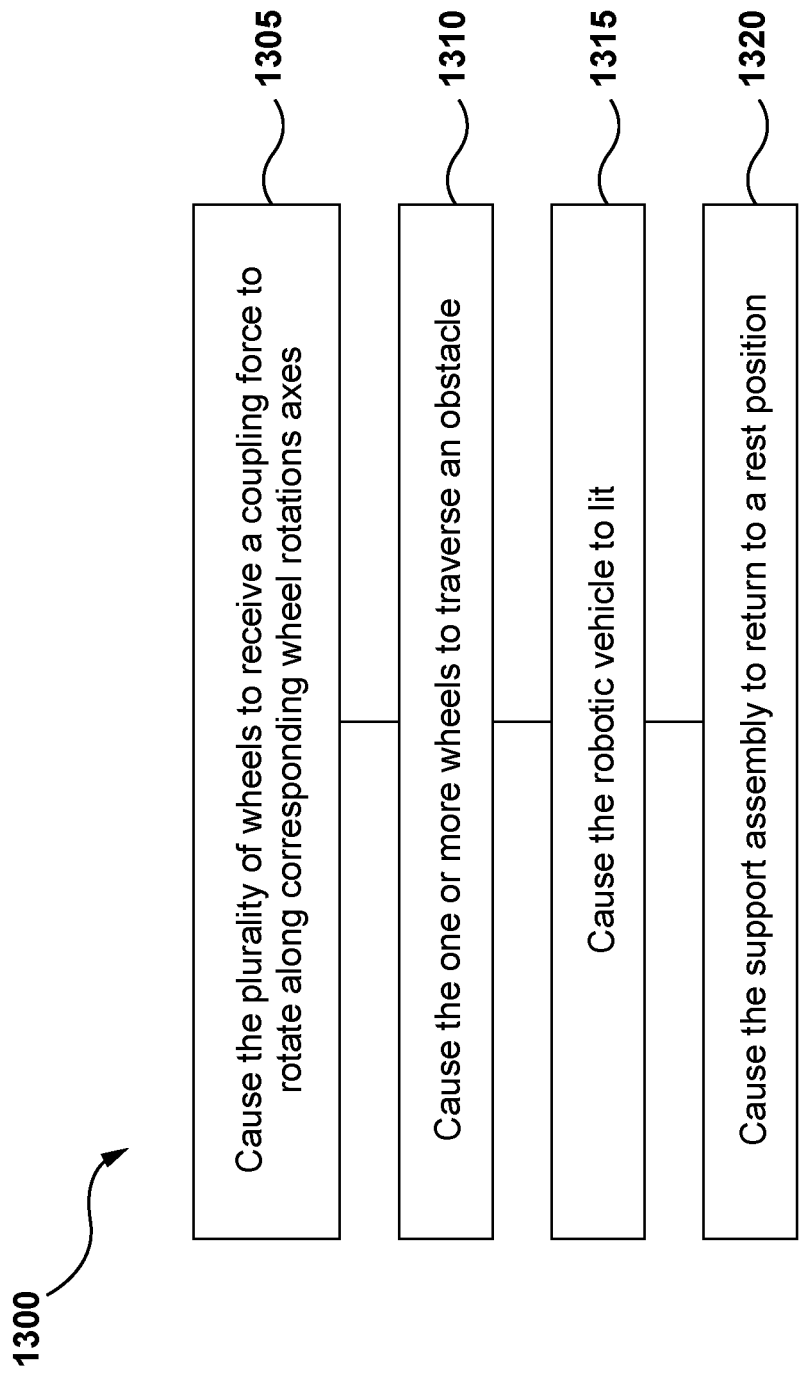
FIG. 13 shows a flowchart of a method performed in accordance with various implementations of the disclosed technology.

FIG. 13 is flow diagram of a method 1300 for overcoming an obstacle for a robotic vehicle, such as the robotic vehicles 220 or 300, according to some embodiments of the present technology. In one or more aspects, the method 1300 or one or more steps thereof may be performed by a computing device, such as the computing device 210. The method 1300 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

In this embodiment of the method 1300, the robotic vehicle comprising a computer system, and a plurality of sensors communicably connected the computer system, a wheel controller communicably connected the computer system, and a plurality of wheels operatively connected to the wheel controller. The robotic vehicle also comprises the arm assembly 350 disposed on one or more wheels of the plurality of wheels, the one or more wheels being disposed on a frontside of the robotic vehicle, said frontside being defined by a direction of travel of the robotic vehicle.

Step 1305: Cause the Plurality of Wheels to Receive a Coupling Force to Rotate Along Corresponding Wheel Rotations Axes At step 1305, the wheel controller causes the plurality of wheels to receive a coupling force to rotate along their corresponding wheel rotations axes. The robotic vehicle thus navigates on a surface, the support assembly being in a rest position.

In this embodiment, the elbow point 620 is positioned at a level of the wheel attachment point 330 (e.g., at a same height off the ground surface when the robotic vehicle 300 is static) in the rest position.

Step 1310: Cause the One or More Wheels to Traverse an Obstacle

At step 1310, upon the one or more wheels encountering an obstacle, the wheel controller causes the one or more wheels to traverse the obstacle, thereby causing a rotation of the forearm element 630 at the elbow point 620.

In a first example illustrated in FIGS. 7 TO 12, the obstacle is a step and the robotic vehicle traverses the step by going from a lower surface to a higher surface. In said example, the one or more wheels abut the step, and, due to a coupling force exerted on the one or more wheels and an adherence thereof on the step, climb the obstacle. Said climbing causes an upward rotation of the second arm portion at the arm pivot point. In one embodiment, the biasing element 640 applies a resisting force opposed to said upward rotation.

In a second example, the obstacle is a step and the robotic vehicle traverses the step by going from a higher surface to a lower surface. In said example, the one or more wheels falls from the step and reach the lower surface causing a downward rotation of the second arm portion at the arm pivot point. In one embodiment, the biasing element 640 (i.e. the second resisting member 644) applies a resisting force opposed to said downward rotation.

Step 1315: Cause the Robotic Vehicle to Tilt

At step 1315, once the one or more wheels have traversed the obstacle, the biasing element 640 may cause the robotic vehicle to tilt. Indeed, as the one or more wheels and the rest of the wheels are not on the same surface, and that the biasing element 640 dampened a rotation of the second arm portion at the arm pivot point, the robotic vehicle may tilt.

More specifically, in the first example, the biasing element causes a downward rotation of the second arm portion at the arm pivot point once the one or more wheels have traversed the obstacle. The robotic vehicle may further navigate while being tilted until the rest of the wheels traverse the obstacle.

In the second example, once the one or more wheels reach the lower surface, the normal force of the lower surface causes an upward rotation of the second arm portion at the arm pivot point. As such, the biasing element 640 (i.e. the first resisting member 642) dampens said upward rotation.

Step 1320: Cause the Support Assembly to Return to a Rest Position

At step 1320, once the robotic vehicle has traversed the obstacle (i.e. all the wheels have traversed the obstacle), the biasing element 640 may cause the support assembly to return to the rest position.

It should be expressly understood that not all technical effects mentioned herein need to be enjoyed in each and every implementation of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A support assembly for a wheel of a robotic vehicle, the robotic vehicle comprising a chassis, a body connected to the chassis, the wheel being connected to the chassis by the support assembly, the support assembly comprising:
a first arm portion and a second arm portion;
the first arm portion being attachable to the chassis at an attachment point and projecting forwardly relative to the attachment point in a current direction of travel of the robotic vehicle and downwardly toward a ground surface on which the robotic vehicle navigates;
the second arm portion being pivotably connected with the first arm portion at an arm pivot point, such that:
the second arm portion is configured to pivot around the arm pivot point without causing the first arm portion to change an orientation thereof relative to the ground surface;
the second arm portion extending forwardly relative to the arm pivot point in the current direction of travel of the robotic vehicle;

the wheel being rotatably mounted on one end of the second arm portion opposed to the arm pivot point, the wheel being rotatable around a wheel rotation axis, the wheel rotation axis being positioned at least as high as the arm pivot point relative to a surface on which the robotic vehicle is positioned.

2. The support assembly of claim 1, wherein the wheel rotation axis being positioned at least as high as the arm pivot point relative to the surface includes the wheel rotation axis being positioned at a same level with the arm pivot point relative to a substantially flat surface on which the robotic vehicle is positioned.

3. The support assembly of claim 1, further comprising a biasing element configured for limiting an angular range of movement of the second arm portion relative to the first arm portion.

4. The support assembly of claim 1, further comprising a biasing element configured for dampening an angular range of movement of the second arm portion relative to the first arm portion.

5. The support assembly of claim 4, wherein the biasing element comprises at least two resisting members, the at least two resisting members cooperating to dampen a rotation of the second arm portion around the arm pivot point.

6. The support assembly of claim 4, wherein the biasing element comprises a composite spring element.

7. The support assembly of claim 6, wherein the composite spring element is made from a fiberglass material.

8. The support assembly of claim 1, wherein the second arm portion pivots upwardly at the arm pivot point during climbing of an obstacle.

9. The support assembly of claim 1, wherein the second arm portion pivots downwardly at the arm pivot point during the climbing of an obstacle.

10. A robotic vehicle comprising:
a computer system;
a plurality of sensors communicably connected the computer system;
a wheel controller communicably connected the computer system;
one or more wheels operatively connected to the wheel controller, the computer system causing the robotic vehicle to navigate by controlling the wheels and based on information received from the plurality of sensors;
at least one support assembly, each support assembly operatively connecting one of the one or more wheels to a chassis of the robotic vehicle, a given support assembly comprising:
a first arm portion and a second arm portion;
the first arm portion being attachable to the chassis of the robotic vehicle at an attachment point and projecting forwardly relative to the attachment point in a current direction of travel of the robotic vehicle and downwardly toward a ground surface on which the robotic vehicle navigates;
the second arm portion being pivotably connected with the first arm portion at an arm pivot point, such that:
the second arm portion is configured to pivot around the arm pivot point without causing the first arm portion to change an orientation thereof relative to the ground surface;
the second arm portion extending forwardly relative to the arm pivot point in the current direction of travel of the robotic vehicle;
a corresponding wheel on which the support assembly is connected being rotatably mounted on one end of the second arm portion opposed to the arm pivot point, said wheel being rotatable around a wheel rotation axis, the wheel rotation axis being positioned at least as high as the arm pivot point relative to a surface on which the robotic vehicle is positioned.

11. The robotic vehicle of claim 10, wherein the wheel rotation axis being positioned at least as high as the arm pivot point relative to the surface includes the wheel rotation axis being positioned at a same level with the arm pivot point relative to a substantially flat surface on which the robotic vehicle is positioned.

12. The robotic vehicle of claim 10, further comprising a biasing element configured for limiting an angular range of movement of the second arm portion relative to the first arm portion.

13. The robotic vehicle of claim 10, further comprising a biasing element configured for dampening an angular range of movement of the second arm portion relative to the first arm portion.

14. The robotic vehicle of claim 10, wherein the one or more wheels is a plurality of wheels, the plurality of wheels comprising two wheels facing a current direction of movement of the robotic vehicle, and the robotic vehicle comprises a respective support assembly of the at least one support assembly on each one of said two wheels.

15. The robotic vehicle of claim 14, wherein the plurality of wheels is arranged in a plurality of rows, each row being aligned with a current direction of movement of the robotic vehicle, and the robotic vehicle comprises: (i) the respective support assembly of the at least one support assembly disposed on outermost wheels of the plurality of rows, (ii) the respective support assemblies disposed on wheels facing said current direction projecting forwardly with respect to said current direction, and (iii) the respective support assemblies disposed on remaining outermost wheels projecting oppositely with respect to said current direction.

16. A method for overcoming an obstacle for a robotic vehicle, the robotic vehicle comprising a computer system, and a plurality of sensors communicably connected to the computer system, a processor communicably connected to the computer system, and a plurality of wheels operatively connected to the processor, the robotic vehicle comprising the support assembly of claim 1 disposed on one or more wheels of the plurality of wheels, the one or more wheels being disposed on a frontside of the robotic vehicle, said frontside being defined by a direction of a movement of the robotic vehicle, the method comprising:

causing the plurality of wheels to receive a coupling force to rotate along corresponding wheel rotations axes, thereby causing the robotic vehicle to navigate on a surface, the support assembly being in a rest position;

causing, upon the one or more wheels encountering an obstacle, the one or more wheels to traverse the obstacle, thereby causing a rotation of the second arm portion at the arm pivot point;

causing, by a biasing element configured for dampening an angular range of movement of the second arm portion relative to the first arm portion, the robotic vehicle to tilt; and causing, by the biasing element and once the robotic vehicle has traversed the obstacle, the support assembly to return to the rest position.

17. The method of claim 16, wherein the obstacle is a step such that the robotic vehicle goes from a lower surface to a higher surface, and wherein the causing upon the one or more wheels encountering an obstacle, the one or more wheels to traverse the obstacle, thereby causing the rotation of the second arm portion at the arm pivot point comprises:

causing, upon the one or more wheels abutting the step, the one or more wheels to climb the obstacle, thereby causing an upward rotation of the second arm portion at the arm pivot point.

18. The method of claim 17, wherein the causing, by the biasing element configured for dampening the angular range of movement of the second arm portion relative to the first arm portion, the robotic vehicle to tilt, comprises:

causing, by the biasing element, a downward rotation of the second arm portion at the arm pivot point.

19. The method of claim 16, wherein the obstacle is a step such that the robotic vehicle goes from a higher surface to a lower surface, and wherein the causing, upon the one or more wheels encountering an obstacle, the one or more wheels to traverse the obstacle, thereby causing the rotation of the second arm portion at the arm pivot point comprises:

causing, upon the one or more wheels going down the step, the one or more wheels to reach the lower surface, thereby causing a downward rotation of the second arm portion at the arm pivot point.

20. The method of claim 19, wherein the causing, by the biasing element configured for dampening the angular range of movement of the second arm portion relative to the first arm portion, the robotic vehicle to tilt comprises:

dampening, by the biasing element, an upward rotation of the second arm portion at the arm pivot point.

* * * * *